United States Patent
Yabuki et al.

(10) Patent No.: US 11,534,693 B2
(45) Date of Patent: Dec. 27, 2022

(54) VIDEO GAME WITH VIDEO GAME STAGES PLAYABLE IN DIFFERENT MODES, AND ASSOCIATED INFORMATION PROCESSING SYSTEM, STORAGE MEDIUM, APPARATUS, AND METHOD

(71) Applicant: NINTENDO CO., LTD., Kyoto (JP)

(72) Inventors: Kosuke Yabuki, Kyoto (JP); Yugo Hayashi, Kyoto (JP); Shinya Fujiwara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 53 days.

(21) Appl. No.: 17/177,716

(22) Filed: Feb. 17, 2021

(65) Prior Publication Data
US 2021/0268387 A1 Sep. 2, 2021

(30) Foreign Application Priority Data
Feb. 28, 2020 (JP) .............................. JP2020-033734

(51) Int. Cl.
*A63F 13/69* (2014.01)
*A63F 13/537* (2014.01)
*A63F 13/58* (2014.01)

(52) U.S. Cl.
CPC ............ *A63F 13/69* (2014.09); *A63F 13/537* (2014.09); *A63F 13/58* (2014.09)

(58) Field of Classification Search
None
See application file for complete search history.

(56) References Cited

U.S. PATENT DOCUMENTS

| 6,336,861 | B1 * | 1/2002 | Konoe | A63F 13/843 |
| | | | | 463/24 |
| 2003/0109297 | A1 * | 6/2003 | Fukutome | A63F 13/58 |
| | | | | 463/7 |

OTHER PUBLICATIONS

"Mario Kart Tour" review, Game Watch [online], Oct. 1, 2019, 12 pages. https://game.watch.impress.co.jp/docs/review/1209920.html [searched on Nov. 5, 2021].
From 12:00 (noon) on Dec. 25, a special event quest of a very high difficulty "Kinkinogoku" appears in a limited period of time! Let's get a reward by winning a stage! Even multi guests can go through stages from now on!, Monster Strike <Monst> official site, Dec. 20, 2018, 5 pages. https://www.monster-strike.com/news/20181220_5.html [searched on Nov. 5, 2021].

(Continued)

*Primary Examiner* — Damon J Pierce
(74) *Attorney, Agent, or Firm* — Nixon & Vanderhye PC

(57) ABSTRACT

An example of an information processing system gives an in-game virtual reward associated with a first designated game stage to a user on condition that a result of a first game played by the user satisfies the reward giving condition. The information processing system gives the in-game virtual reward associated with a second designated game stage to the user on condition that a result of a second game played by the user satisfies the reward giving condition. Regardless of whether an in-game virtual reward is given based on the result of the first game played by the user or the result of the second game played by the user, the information processing system changes an in-game element in the first game mode from a state where it is not permitted to be played by the user to a state where it is permitted to be played by the user.

20 Claims, 16 Drawing Sheets

(56) References Cited

OTHER PUBLICATIONS

[Monst] Clear Kinkinogoku by multiple plays! The list of characters recommended for hosts/guests!, Applibito [online], Jan. 28, 2019, 4 pages https://applibito.com/%E3%80%90%E3%83%A2%E3%83%B3%E3%82%B9%E3%83%88%E3%80%91%E7%A6%81%E5%BP%8C%E3%81%AE%E7%8D%84%E3%81%AF%E3%83%9E%E3%83%AB%E3%83%81%E3%81%A7%E3%82%AF%E3%83%AA%E3%82%A2%E3%81%9B%E3%82%88%EF%BC%81%E3%83%9B/ [searched on Nov. 5, 2021].

Notice of Reasons for Refusal dated Nov. 24, 2021 in corresponding Japanese Patent Application No. 2020-033734 with English machine translation, 13 pages.

"A multiplayer beta test will be available for subscribers" [online], Nintendo Co., Ltd., [searched on Feb. 20, 2020], internet <https://mariokarttour.com/ja-JP/multiplay/beta> (https://web.archive.org/web/20191220162525/https://mariokarttour.com/ja-JP/multiplay/beta) and its English corresponding https://web.archive.org/web/20191220162525/https://mariokarttour.com/en-US/multiplay/beta), printed on Feb. 16, 2021, 4 pages.

* cited by examiner

Fig.9

(a) COURSES HAVE NOT YET BEEN PLAYED

| COURSE | CITY COURSE | VALLEY COURSE | HILLS COURSE |
|---|---|---|---|
| SINGLE MODE | ★★★★★ | ★★★★★ | ★★★★★ |
| MULTI-MODE | ★★★★★ | ★★★★★ | ★★★★★ |

(b) COURSES HAVE BEEN PLAYED IN MULTI-MODE

| COURSE | CITY COURSE | VALLEY COURSE | HILLS COURSE |
|---|---|---|---|
| SINGLE MODE | ★★★★★ | ★★★★★ | ★★★★★ |
| MULTI-MODE | ☆☆☆☆★ | ☆☆☆★★ | ☆☆★★★ |

STARS ARE ACQUIRABLE ACCORDING TO GAME RESULT IN MULTI-MODE

(c) COURSES HAVE BEEN PLAYED ALSO IN SINGLE MODE

| COURSE | CITY COURSE | VALLEY COURSE | HILLS COURSE |
|---|---|---|---|
| SINGLE MODE | ★★★★☆ | ★★★☆★ | ★★★★★ |
| MULTI-MODE | ☆☆☆☆★ | ☆☆☆★★ | ☆☆★★★ |
| DISPLAY IN SINGLE MODE | ☆☆☆☆☆ | ☆☆☆☆★ | ☆☆★★★ |

ADDITIONAL STARS ARE ACQUIRABLE IN SINGLE MODE

VIDEO GAME WITH VIDEO GAME STAGES PLAYABLE IN DIFFERENT MODES, AND ASSOCIATED INFORMATION PROCESSING SYSTEM, STORAGE MEDIUM, APPARATUS, AND METHOD

CROSS REFERENCE TO RELATED APPLICATION

This application claims priority to Japanese Patent Application No. 2020-033734, filed on Feb. 28, 2020, the entire contents of which are incorporated herein by reference.

FIELD

The technique shown here relates to an information processing system, a storage medium, an information processing apparatus, and an information processing method for executing a game in a plurality of play modes.

BACKGROUND AND SUMMARY

Conventionally, an information processing system which executes a game in two modes has been known. For example, there is a game system including a single player mode in which a user plays a game alone, and a multiplayer mode in which a user plays a game with another user.

In the conventional game system, the result of a game stage played in one of the two modes is not reflected in the other mode. Therefore, there is room for improvement in efficiency of gameplay.

Therefore, the present application discloses an information processing system, a storage medium, an information processing apparatus, and an information processing method which are able to improve efficiency of gameplay.

(1) An example of an information processing system, comprising: a processor and a memory coupled thereto, the processor being configured to control the information processing system to at least: designate one game stage from among game stages being permitted to be played by a user, as a first designated game stage to be played by the user, in a first game mode; execute a first game in the first designated game stage in the first game mode; give an in-game virtual reward associated with the first designated game stage, to the user, in accordance with that a result of the first game played by the user satisfies a reward giving condition; designate one game stage as a second designated game stage to be played by the user, in a second game mode in which at least one game stage is being permitted to be played by the user regardless of whether the at least one game stage is being permitted to be played by the user in the first game mode; execute a second game in the second designated game stage in the second game mode; give the in-game virtual reward associated with the second designated game stage, to the user, in accordance with that a result of the second game played by the user satisfies the reward giving condition; and change, based on the in-game virtual reward, an in-game element in the first game mode from a state where use of the in-game element by the user is not permitted to a state where use of the in-game element by the user is permitted, regardless of whether the in-game virtual reward is one given according to the result of the first game or one given according to the result of the second game.

According to the configuration of the above (1), when the user has played a game in a game stage in either of the two game modes, the user can put an in-game element in a state where use of the in-game element is permitted, by using an in-game virtual reward given to the user according to the result of the game. Thus, efficiency of gameplay by the user can be enhanced.

(2) The in-game element may be a selection based on probability for giving a game object to the user. The processor may control the information processing system, based on the in-game virtual reward, to change at least one selection based on probability from a state where execution of the selection by the user is not permitted to a state where execution of the selection by the user is permitted.

According to the configuration of the above (2), efficiency of gameplay can be enhanced for the user who progresses the first game mode to put a selection based on probability in the state where execution of the selection is permitted.

(3) The in-game element may be a game item.

According to the configuration of the above (3), efficiency of gameplay can be enhanced for the user who progresses the first game mode to put a game item in the state where use of the game object is permitted.

(4) The in-game element may be a game stage. The processor may control the information processing system, based on the in-game virtual reward, to change at least one game stage from a state where play of the game stage by the user is not permitted to a state where play of the game stage by the user is permitted.

According to the configuration of the above (4), efficiency of gameplay can be enhanced in the first game mode in which the user sequentially progresses games in game stages in order.

(5) At least some of the game stages in the first game mode may be given an order in which the game stages are permitted to be played. The processor may further control the information processing system to set a clear flag on a game stage having been played and cleared by the user in the first game mode. The processor may control the information processing system to change a subsequent game stage that follows the game stage on which the clear flag is set, from a state where play of the subsequent game stage by the user is not permitted to a state where play of the game stage by the user is permitted, based on the in-game virtual reward and on the clear flag set on the game stage, in the first game mode. Even when a game stage, which is not permitted to be played by the user in the first game mode, may be cleared by being played by the user in the second game mode, the clear flag is not associated with the game stage.

According to the configuration of the above (5), the rule of the first game mode, in which a user having cleared a game stage can proceed to the subsequent game stage, is maintained. Thus, even when an in-game virtual reward is given to the user according to the game result in the second game mode, the risk of reduction in the interest of the user in the first game mode can be reduced.

(6) At least one reward giving condition may be set for the game stage, the reward giving condition being a condition for giving the in-game virtual reward associated with the game stage. The processor may control the information processing system to: calculate a first parameter indicating a result of the first game, in the first designated game stage, played by the user; calculate a second parameter indicating a result of the second game, in the second designated game stage, played by the user; give, to the user, the in-game virtual reward corresponding to the reward giving condition when the first parameter satisfies the reward giving condition; and give, to the user, the in-game virtual reward corresponding to the reward giving condition when the second parameter satisfies the reward giving condition.

According to the configuration of the above (6), an in-game virtual reward can be given to the user for each reward giving condition satisfied according to the result of the gameplay.

(7) The processor may control the information processing system to: calculate the first parameter each time the user plays the first designated game stage; calculate the second parameter each time the user plays the second designated game stage; determine whether or not the calculated first parameter satisfies the reward giving condition each time the user plays the first designated game stage; and give the in-game virtual reward when the reward giving condition is satisfied for the first time in either the first game mode or the second game mode. The in-game virtual reward may be not redundantly given when the reward giving condition, which has already been satisfied in either the first game mode or the second game mode, is satisfied again.

(8) The processor may further control the information processing system to, when the first parameter or the second parameter is calculated for the first time in game stages, store the first parameter or the second parameter as a record value for each game stage. The processor may control the information processing system to: when the first parameter or the second parameter calculated in a certain game stage indicates a better score in the game as compared to the record value regarding the game stage, update the record value to a new record value that is the first parameter or the second parameter; when the record value satisfies the reward giving condition in the first game mode, give the in-game virtual reward corresponding to the reward giving condition to the user; and when the record value satisfied the reward giving condition in the second game mode, give the in-game virtual reward corresponding to the reward giving condition to the user.

According to the configuration of the above (7) or (8), since an in-game virtual reward is not redundantly given to the user in response to one reward giving condition being satisfied, it is possible to reduce the risk that too many in-game virtual rewards are given to the user.

(9) The processor may further control the information processing system to, when the record value, regarding a game stage which is not permitted to be played by the user in the first game mode, has been stored or updated in the second game mode, generate an image in which the record value is associated with the game stage and display the image on a display in the first game mode.

According to the configuration of the above (9), even when the record value is updated in the second game mode, the information processing system can correctly display the record value in the first game mode.

(10) The reward giving condition set for the same game stage in the first game mode and the second game mode may be common to the first game mode and the second game mode. The processor may control the information processing system to execute the second game in the game stage in the second game mode under a game condition that allows the reward giving condition to be satisfied more easily than a game condition used when the first game of the game stage is executed in the first game mode.

(11) The reward giving condition set for the same game stage in the first game mode and the second game mode may be common to the first game mode and the second game mode. The processor may control the information processing system to execute the second game in a game stage in the second game mode under a game condition that allows the reward giving condition to be satisfied less easily than a game condition used when the first game of the game stage is executed in the first game mode.

According to the configuration of the above (10) or (11), in the second game mode, it is possible to cause the user to play the game with the game condition different from that in the first game mode. According to the configuration of the above (10), the user who wants to earn more in-game virtual rewards can be motivated to play the game in the second game mode.

(12) The processor may control the information processing system to, when a result of the second game, in the game stage in the second game mode, played by the user satisfies the reward giving condition, give the in-game virtual reward corresponding to the reward giving condition to the user even when the game in the game stage has not been played by the user in the first game mode.

According to the configuration of the above (12), for the user having earned an in-game virtual reward through the game in the second game mode, efficiency of gameplay in the first game mode can be further enhanced.

(13) The first game mode may be a game mode in which a game object operated by the user during the first game competes with a game object controlled by the information processing system during the first game. The second game mode may be a game mode in which a game object operated by the user during the second game competes with a game object operated by another user during the second game.

According to the configuration of the above (13), the game result attained in the game mode in which the user competes with another user is reflected in the game mode in which the user plays the game alone, whereby efficiency of gameplay in the game mode in which the user plays the game alone can be enhanced.

(14) The processor may control the information processing system to designate the second designated game stage regardless of whether or not the second designated game stage is a game stage that is allowed, in the first game mode, to be played by the other user who participates in the competition in the second game mode.

According to the configuration of the above (14), a game stage that the user has not experienced yet (or has not experienced much) in the first game mode is introduced to the user in the second game mode, whereby the user is motivated to play the game of the game stage in the first game mode.

(15) The processor may control the information processing system to change, with a lapse of real time, a game stage being permitted to be played by the user in the second game mode.

According to the configuration of the above (15), it is possible to allow the user to experience a variety of game stages in the second game mode during a predetermined time period.

(16) In the second game mode, the processor may control the information processing system to set, for all the game stages included in the first game mode, whether or not all the game stages are being permitted to be played by the user, so that all the game stages become permitted to be played by the user at least once during a predetermined time period in the second game mode.

According to the configuration of the above (16), it is possible to give, in the second game mode, the user an opportunity for experiencing a variety of game stages in the first game mode.

(17) The game stages may be courses in a racing game.

The present specification discloses an information processing apparatus (e.g., a terminal device or a server)

executing the processes described in the above (1) to (17). In addition, the present specification discloses a storage medium having stored therein an information processing program that causes a computer to execute the entirety or a part of the processes described in the above (1) to (17). In addition, the present specification discloses an information processing method to be executed in the information processing system according to the above (1) to (17).

According to the information processing system, the information processing program, the information processing apparatus, and the information processing method, efficiency of gameplay can be enhanced.

These and other objects, features, aspects and advantages of the exemplary embodiment will become more apparent from the following detailed description when taken in conjunction with the accompanying drawings.

BRIEF DESCRIPTION OF THE DRAWINGS

FIG. 9 shows an example of change in a reward giving state;

DETAILED DESCRIPTION OF NON-LIMITING EXAMPLE EMBODIMENTS

1. Configuration of Information Processing System

Figure 1:
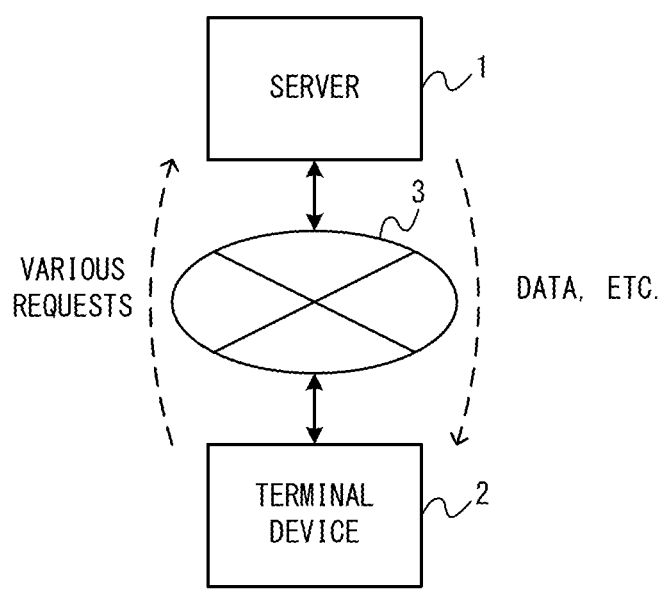
FIG. 1 is a block diagram showing an example of a configuration of a non-limiting information processing system according to an embodiment.

Hereinafter, an information processing system, an information processing program, and an information processing method according to the present embodiment will be described. Firstly, description will be given of the overall configuration of the information processing system and the configurations of the terminal apparatus and a server included in the information processing system according to the present embodiment. FIG. 1 is a block diagram showing an example of the configuration of the information processing system according to the present embodiment. As shown in FIG. 1, the information processing system includes a server 1 and a terminal apparatus 2. The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application (specifically, a game application) to be executed in the terminal apparatus 2. In the present embodiment, the server 1 is a game server for a game to be executed in the terminal apparatus 2, and provides an environment for a game process to be executed in the terminal apparatus 2. For example, in response to a request from the terminal apparatus 2 that executes the game process, the server 1 executes a game process according to need, and transmits, to the terminal apparatus 2, data complying with the request (refer to FIG. 1).

The terminal apparatus 2 is an example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is able to execute a game program (in other words, a game application) for a game for which the server 1 provides services.

(Specific Example of Configuration of Server 1)

Figure 2:
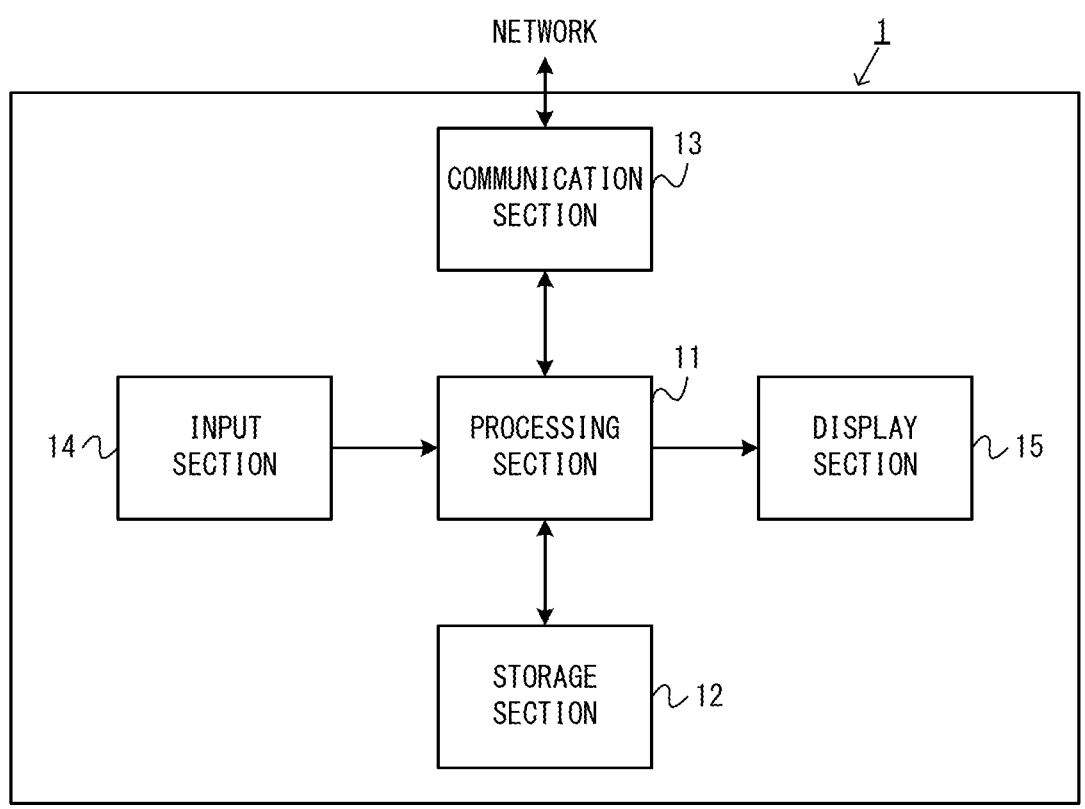
FIG. 2 is a block diagram showing an example of a configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the terminal apparatus 2.

The server 1 includes a communication section 13. The communication section 13 is connected to the network 3, and has a function of communicating with other devices (e.g., the terminal apparatus 2) via the network 3. The server 1 further includes an input section 14 and a display section 15 as input/output interfaces.

(Specific Example of Configuration of Terminal Apparatus 2)

Figure 3:
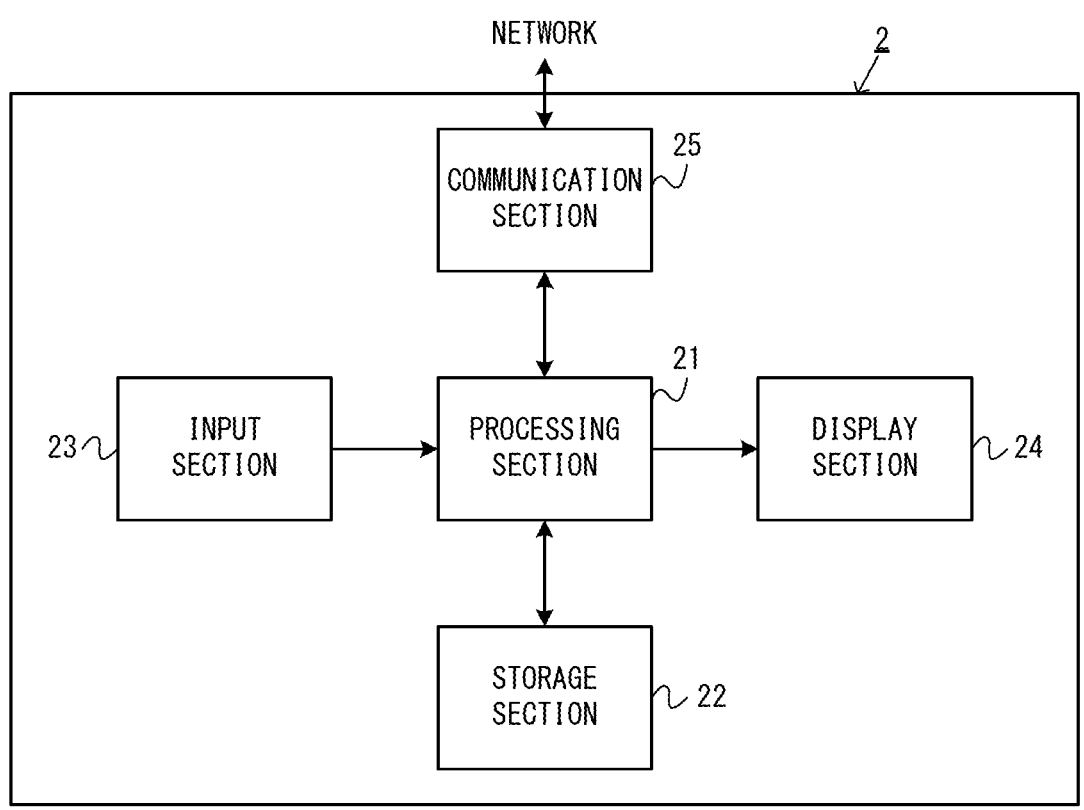
FIG. 3 is a block diagram showing an example of a configuration of a non-limiting terminal device.

FIG. 3 is a block diagram showing an example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a game controller) separated from the main body unit.

The terminal apparatus 2 includes a display section 24. The display section 24 displays an image (e.g., a game image, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the present embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal apparatus 2 performs communication via the network 3, is discretionary. For example, the communication section 25 may have a function of connecting to a wireless LAN through a communication module with Wi-Fi authentication, or may have both the function of connecting to the mobile communication network and the function of connecting to the wireless LAN.

2. Outline of Processing in Information Processing System

Hereinafter, the outline of processing to be executed in the information processing system according to the present embodiment will be described. In the present embodiment, the information processing system executes a racing game in a game application. However, contents of games to be executed in the information processing system are discretionary, and may be games (e.g., puzzle game, action game, etc.) of genres other than the racing game.

The game application according to the present embodiment allows a game to be executed in two types of game modes, i.e., a single player mode (hereinafter abbreviated as "single mode") and a multiplayer mode (hereinafter abbreviated as "multi-mode"). A user (also referred to as "player") of the terminal device 2 can select either the single mode or the multi-mode to play the racing game.

The single mode is a mode in which a user plays a game alone. In the single mode, a racing game is performed, in which a racing car operated by the user (specifically, a racing car in which a player character operated by the user is riding) races with a racing car operated by the information processing system (specifically, a racing car in which a non-player character operated by the information processing system is riding). The racing car operated by the information processing system in the single mode is not operated by another user while the user plays the game, and may be controlled according to an algorithm defined in the game application, or may be controlled based on past play data of the user or another user (e.g., operation data obtained when the user traveled the racing course in the past, or data indicating a route in which the user ran on the racing course in the past). That is, the single mode may be a game mode in which the user non-simultaneously competes with another user by using play data of the other user.

The multi-mode is a mode in which the user of the terminal device 2 simultaneously plays a game with another user. In the multi-mode, a racing game is performed, in which a racing car operated by the user races with a racing car that is operated by another user using a terminal device communicable with the server 1. That is, the multi-mode is a game mode in which the racing car operated by the user during the racing game competes with the racing car operated by the other user during the racing game.

2-1. Single Mode

Next, the outline of processing in the single mode will be described. In the single mode, a plurality of cups are prepared, and the game is progressed by the user clearing the cups one by one. Here, a "game stage group" consisting of a plurality of game stages (specifically, racing courses) is referred to as a "cup". In the present embodiment, one cup includes four racing courses, and when the user has cleared the four racing courses, the user has cleared the corresponding cup. In the present embodiment, a sequential order (referred to as "progression order") is given to the plurality of cups, and the user is allowed to perform the game in the next cup on condition that he/she has cleared the previous cup (and satisfies a release condition described later).

Figure 4:
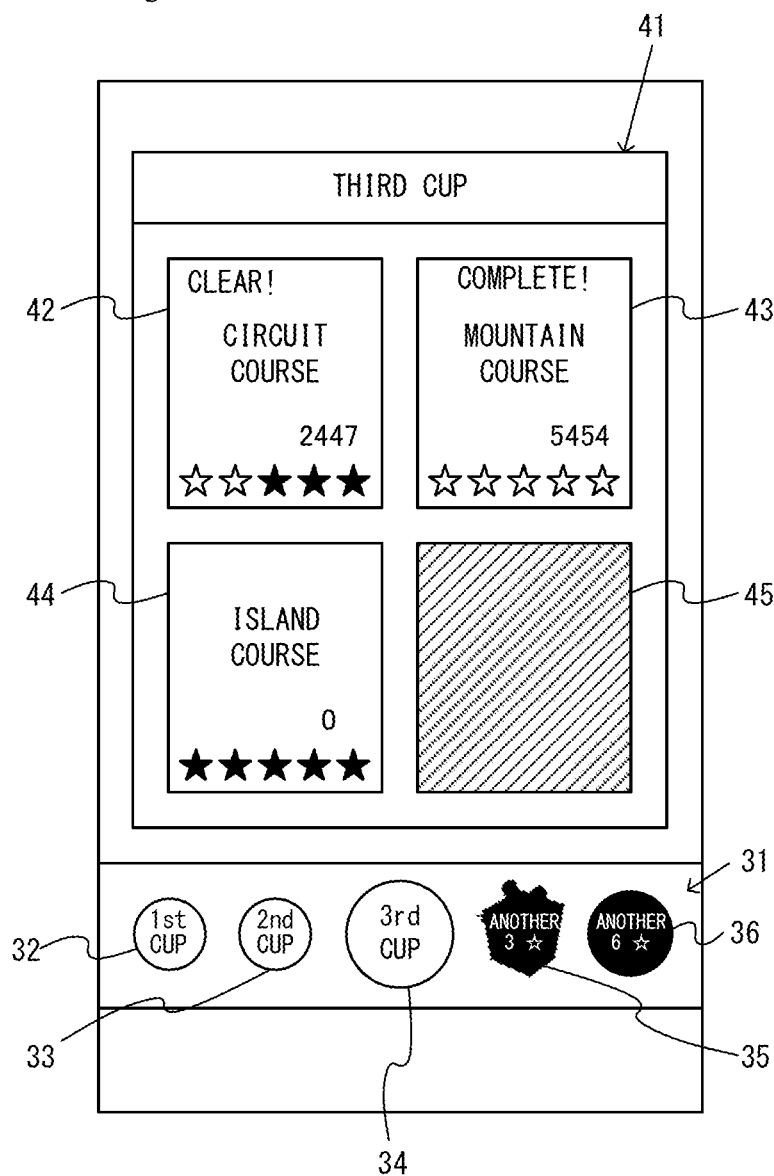
FIG. 4 shows an example of a non-limiting single mode image.

FIG. 4 shows an example of a single mode image. In the present embodiment, when the single mode is started in the game application, the terminal device 2 displays the single mode image as shown in FIG. 4 on a display section 24. As shown in FIG. 4, the single mode image includes an icon display area 31 and a detail display area 41.

The icon display area 31 is an area in which cup icons representing the aforementioned cups (e.g., cup icons 32 to 34 and 36 shown in FIG. 4) are displayed. Although a detailed description will be given later, in the icon display area 31, a gift icon (e.g., a gift icon 35 shown in FIG. 4) and a selection icon (e.g., a selection icon 58 shown in FIG. 7) may be displayed in addition to the cup icons. In the present embodiment, a variety of icons (i.e., cup icons, a gift icon, and a selection icon) are arrayed in a line in a virtual space, and a part of the virtual space (a range in which five icons are arranged) is displayed in the icon display area 31. The icons displayed in the icon display area 31 are scrolled left and right by an operation of the user (e.g., an operation of sliding the icons left and right). That is, by scrolling the icons, the user can cause desired icons, among the icons arranged in the virtual space, to be displayed in the icon display area 31. In the present embodiment, among the icons displayed in the icon display area 31, an icon arranged in the center is an icon being selected. The icon being selected is displayed a little larger than the icons not being selected. As described above, the user can change the icon being selected by scrolling the icons.

The detail display area 41 is an area in which detailed information regarding the icon being selected is displayed. In the example shown in FIG. 4, the cup icon 34 representing the third cup is being selected, and a cup image indicating information regarding the third cup is displayed in the detail display area 41. That is, when the user causes a cup icon to be in the state of being selected, the user can cause a cup image corresponding to the cup represented by the cup icon to be displayed in the detail display area 41.

A cup image includes an image representing the name of a cup corresponding to the cup image (in the example of FIG. 4, "third cup"), and course images representing a plurality of racing courses included in the cup (in the example of FIG. 4, course images 42 to 45). As shown in FIG. 4, the course images include course name information indicating the names of the racing courses (in the example of FIG. 4, "circuit course", "mountain course", and "island course"). In the present embodiment, when the user performs an input of designating a course image (e.g., an input of touching the course image), the game of the racing course represented by the course image is started (on condition that the racing course is in a playable state). Therefore, the user can select a desired racing course from among the racing courses included in the cup, and play the racing course (i.e., perform the game of the racing course).

In the present embodiment, each time a game per racing course has been performed by the user, a score indicating the result of the game (in other words, the content of the game) is calculated. Any score calculating method may be adopted. For example, the score may be calculated based on the time of the racing, an action that the player character has performed during the racing, or a character, a racing car, etc., used during the racing. The score calculating method may be common to all the racing courses, or may differ among the racing courses.

As shown in FIG. 4, each course image includes best score information indicating the best score of the racing course. The "best score of a racing course" is the highest score ever earned by the user in the racing course. In the example shown in FIG. 4, the best score in the circuit course is "2447", and the best score in the mountain course is "5454". In the example shown in FIG. 4, the island course has not yet been played by the user. Therefore, the best score in the island course is "0". The user can check his/her best score per racing course by referring to the course images.

In the present embodiment, a reward is given to the user according to the score (more specifically, the best score). In the present embodiment, the reward is a star (in other words, an index indicating a game achievement state) to be used for satisfying a release condition described later. In the present embodiment, a predetermined number of stars are assigned to each racing course, and stars, the number of which depends on the score, are given to the user. For example, 5 stars are assigned to a certain racing course, and 1 star is given to the user each time the score exceeds 1000, so that 5 stars are given at the maximum. That is, in present embodiment, a condition of giving a reward (referred to as "reward giving condition") is set for each racing course. When the score satisfies the reward giving condition, a reward corresponding to the satisfied reward giving condition is given to the user. The number of stars assigned to one racing course is discretionary, and different numbers of stars may be assigned to the respective racing courses. A condition of giving a star may differ among the racing courses.

In the present embodiment, the user can repeatedly perform a game of a racing course that has become playable. In a case where the best score is updated, if a reward giving condition that has not been satisfied until then is satisfied, the information processing system gives a star corresponding to the reward giving condition to the user. For example, in a case where the user earned 3 stars in the first game of a certain racing course and thereafter earned a score satisfying the reward giving condition for the fourth star in the second game, the information processing system gives one additional star to the user.

As shown in FIG. 4, each course image includes acquisition state information indicating a star acquisition state of the corresponding racing course. In the present embodiment, white stars and black stars are displayed in the course image as the acquisition state information. The number of white stars indicates the number of stars already acquired by the user, the number of black stars indicates the number of stars not yet acquired by the user, and the sum of the white stars and the black stars indicates the number of stars assigned to the racing course (see FIG. 4). The acquisition state information allows the user to confirm the star acquisition state for each racing course.

Each course image includes clear information indicating a clear state of the corresponding racing course. In the present embodiment, each course image includes information indicating "clear" or "complete" as the clear information (see FIG. 4). Specifically, when the user has finished the racing course without retiring, the information processing system determines that the racing course has been cleared, and displays a course image including information indicating "clear". Meanwhile, as for a racing course in which the user has earned all the stars assigned thereto, the information processing system displays a course image including information indicating "complete". As for a racing course that has not yet been cleared (e.g., the island course shown in FIG. 4), a course image including no clear information is displayed.

In the present embodiment, a sequential order is given to racing courses included in a playable cup, and the user is allowed to play the next racing course on condition that the previous racing course has been cleared. That is, at a time point when a cup becomes playable, only the first racing course in the cup is playable. The user can clear all the racing courses in the cup by sequentially clearing the racing courses in order. In the present embodiment, in the cup image, the course image representing the first racing course is disposed in an upper left portion, and the course images representing the second to fourth racing courses are disposed in an upper right portion, a lower left portion, and a lower right portion, respectively.

When a racing course is not playable, a course image representing this racing course is displayed in a manner including none of the aforementioned various information (i.e., course name information, best score information, acquisition state information, and clear information). For example, in the example shown in FIG. 4, since the third island course has not yet been cleared, the fourth racing course (a challenge course shown in FIG. 5) is not playable, and therefore, the course image 45 is displayed in the aforementioned mode. This enables the user to easily distinguish between a racing course in a playable state and a racing course not in a playable state.

In the present embodiment, each cup includes four racing courses consisting of three racing courses and one challenge course. The challenge course is a racing course, the reward giving condition of which is different from that of the other three racing courses. As for the challenge course, a reward giving condition such as "performing a jumping action a predetermined number of times", which is not related to scores calculated in the other three racing courses, is set. Therefore, as for the challenge course, a score, like a score calculated in the other three racing courses, is not calculated (in other words, a score is calculated by a method different from that for the other three racing courses). In the present embodiment, 3 stars are assigned to the challenge course while 5 stars are assigned to each of the other three racing courses.

In the present embodiment, the course configuration (i.e., the shape and topography of a course) of the challenge course is the same as the course configuration of other racing courses different from the challenge course (either racing courses included in the same cup as the challenge course, or racing courses included in another cup). Therefore, it can be said that the challenge course is substantially the same as other racing courses different from the challenge course (except for the reward giving condition).

In another embodiment, a cup need not include a challenge course, or a cup including a challenge course and a cup including no challenge course may coexist.

In the present embodiment, the respective cups are given an order in which the cups are permitted to be played, and the respective racing courses included in each cup are also given an order in which the racing courses are permitted to be played. Therefore, it can be said that the respective racing courses in the single mode are given an order in which the racing courses are permitted to be played. The order of permission for play need not be given to all the racing courses in the single mode, and may be given to at least some of the racing courses. For example, in another embodiment, a racing course that the user can freely play regardless of whether or not another racing course has been cleared, may be included in the plurality of racing courses in the single mode.

As described above, in the present embodiment, the user can earn a star by performing a game of a racing course in the single mode. The information processing system allows the user to use an in-game element in the game application, on condition that the user has earned a predetermined number of stars. An "in-game element" is any element that the user can use in the game. Examples of the in-game element include: a game stage (or story) that the user can play; a game object such as a character and/or an item; and a certain process or game event (e.g., a selection based on probability, described later) in the game. In the present embodiment, the aforementioned "cup", "gift", and "selection, based on probability, for game object" are in-game elements. In the present embodiment, the icons displayed in the icon display area 31 are icons representing the in-game elements.

In the present embodiment, for each of the in-game elements, a release condition is set. The release condition is a condition for making the in-game element usable (in other words, for releasing the in-game element). Specifically, the release condition is a condition regarding the number of stars earned by the user. In the present embodiment, there are in-game elements (i.e., a gift, and selection, based on probability, for game object) that become usable when the release condition is satisfied, and an in-game element (i.e., a cup) that becomes usable when both the release condition and another condition are satisfied.

As shown in FIG. 4, among the icons displayed in the icon display area 31, the icons (icons 35, 36) representing the in-game elements for which the release condition is not satisfied are displayed in a display manner different from that for the icons (icons 32 to 34) representing the in-game elements for which the release condition is satisfied.

Figure 5:
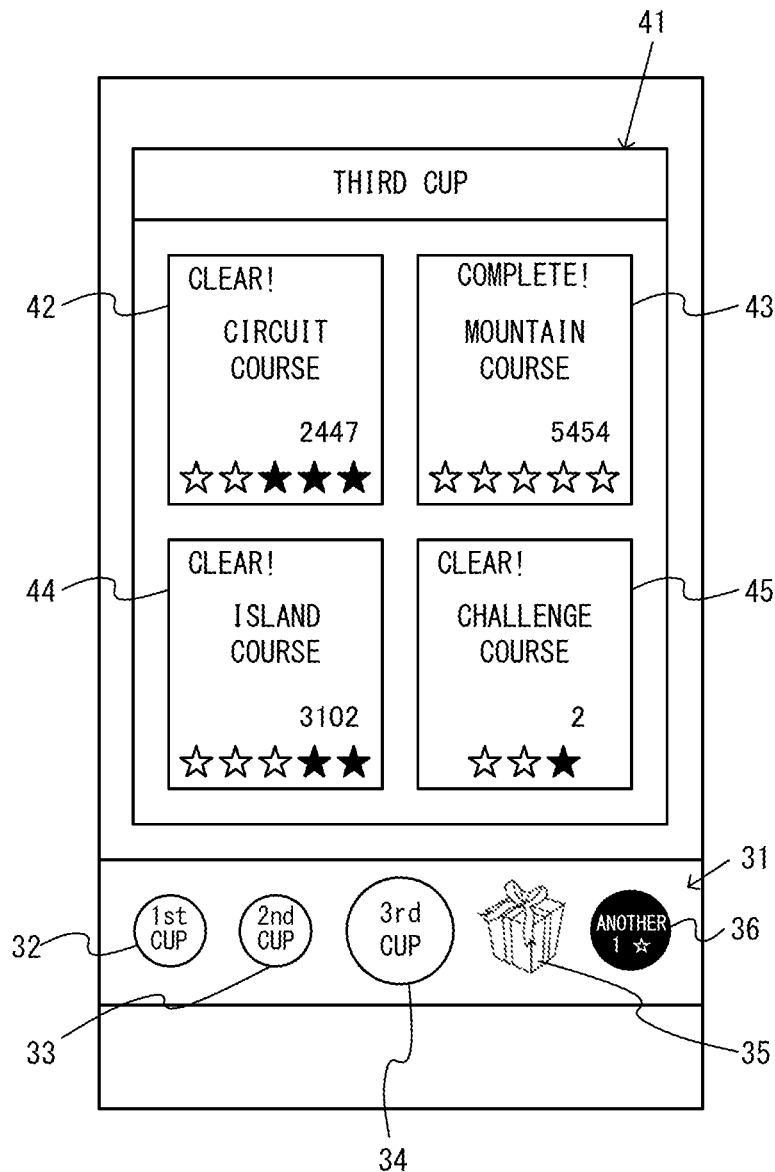
FIG. 5 shows another example of a non-limiting single mode image.

FIG. 5 shows another example of a single mode image. FIG. 5 shows an example of a single mode image displayed when the release condition for the in-game element represented by the icon 35 is satisfied as a result of acquisition of some stars by the user from the state shown in FIG. 4. As shown in FIG. 4 and FIG. 5, in the present embodiment, the icon (e.g., the icon 35 shown in FIG. 4) representing the in-game element for which the release condition is not satisfied is displayed in a display manner such that only the silhouette of the icon (e.g., the icon 35 shown in FIG. 5) displayed when the release condition is satisfied. This allows the user to easily confirm whether or not the release condition of the in-game element has been satisfied.

Although not shown in the drawings, in the single mode image, if an icon representing an in-game element for which the release condition is not satisfied is being selected, the terminal device 2 displays, in the detail display area 41, information indicating that this in-game element is unusable. This also allows the user to easily confirm whether or not the release condition of the in-game element has been satisfied.

As shown in FIG. 4, the icon representing the in-game element for which the release condition is not satisfied, includes information indicating the number of stars (referred to as "remaining number of stars") that the user should earn until the release condition is satisfied. For example, in the example shown in FIG. 4, the gift icon 35 representing a gift box includes information indicating that the remaining number of stars to be earned is three, and the cup icon 36 includes information indicating that the remaining number of stars to be earned is six. Therefore, by referring to the icon of the in-game element for which the release condition is not satisfied, the user can easily confirm the remaining number of stars regarding the in-game element.

In the present embodiment, the icons in the virtual space are arranged in an ascending order of the number of stars required for satisfying the release condition. That is, in the present embodiment, it can be said that the aforementioned progression order is the ascending order of the number of stars required for satisfying the release condition. In the present embodiment, an icon representing an in-game element for which the release condition is satisfied (i.e., an in-game element, of which the number of stars required for satisfying the release condition is equal to or less than a fixed number) is disposed on the left side in the virtual space, while an icon representing an in-game element for which the release condition is not satisfied (i.e., an in-game element, of which the number of stars required for satisfying the release condition is greater than the fixed number) is disposed on the right side in the virtual space.

Figure 6:
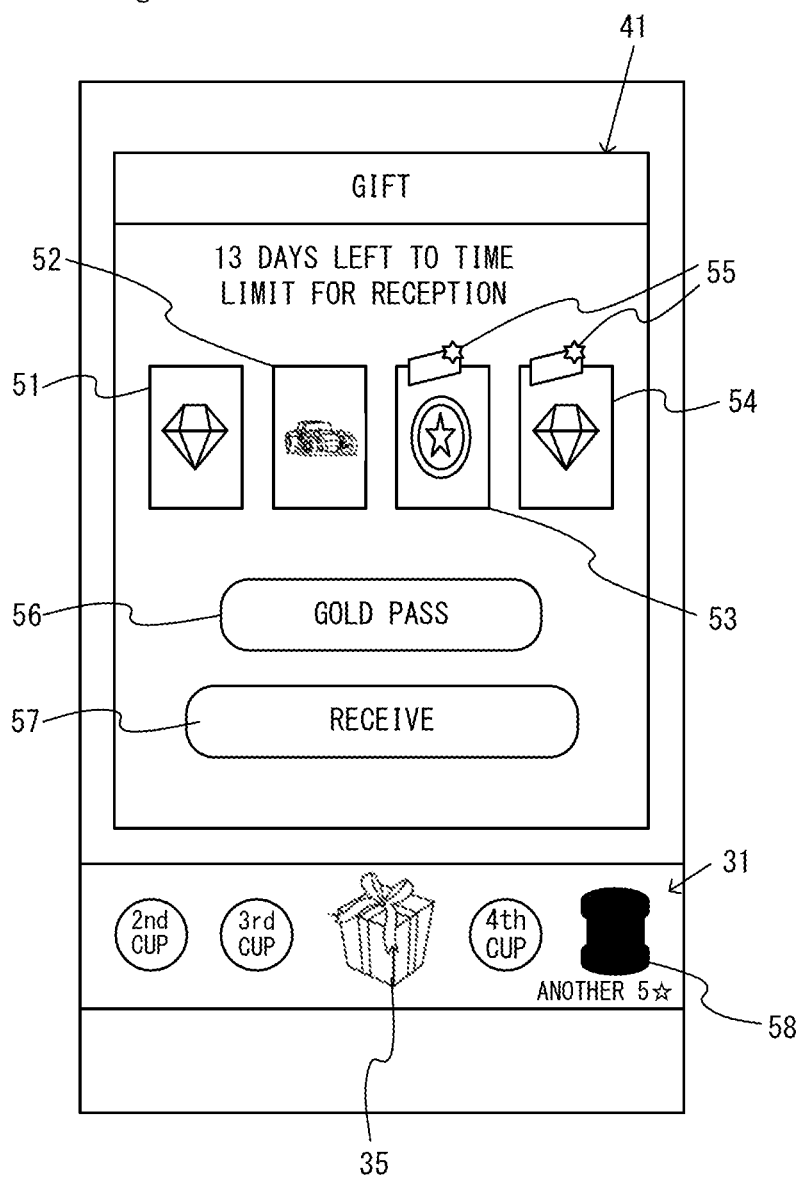
FIG. 6 shows an example a non-limiting single mode image in which a gift icon is being selected.

FIG. 6 shows an example of a single mode image when a gift icon is being selected. FIG. 6 shows an example of a single mode image displayed when scrolling has been performed from the state shown in FIG. 5 so as to cause the gift icon 35 shown in FIG. 5 to be in the selected state. When the gift icon 35 is being selected, a gift image representing gifts to be given to the user (i.e., gifts that the user can use) is displayed in the detail display area 41. The gift image includes item images 51 to 54 to be given as gifts to the user. In the example shown in FIG. 6, the item images 51 and 54 represent jewels to be used for a selection, based on probability, for acquiring a game object. The item image 52 represents a racing car that the player character can use in the racing course. The item image 53 represents a coin for purchasing an item such as a racing car. The gift image also includes information indicating a time limit by which the user can receive the gifts (in FIG. 6, a message "13 days left to the time limit for reception").

The contents of the items given as gifts to the user are discretionary. In another embodiment, a game object given as a gift to the user may be a character that the user can use in the game.

A mark 55 representing a gold pass is assigned to each of the item images 53 and 54. An item image with this mark 55 represents an item that the user can acquire on condition that he/she has the gold pass. The gold pass is an item that the user can acquire by satisfying a predetermined condition. The predetermined condition may be paying a given price, or satisfying a predetermined game condition (e.g., clearing a predetermined racing course). As shown in FIG. 6, the gift image displayed in the detail display area 41 includes a gold pass acquisition button image 56. The gold pass acquisition button image 56 is a button image with which the user performs an instruction to acquire the gold pass. When an input is performed to the button image, the information processing system gives the gold pass to the user, on condition that the user satisfies the predetermined condition.

As shown in FIG. 6, the gift image displayed in the detail display area 41 includes a reception button image 57. The reception button image 57 is a button image with which the user performs an instruction to receive the items of the item images 51 and 52 to which the mark 55 of the gold pass is not assigned. When an input is performed to the button image, the information processing system gives the items of the item images 51 and 52 to the user.

Figure 7:
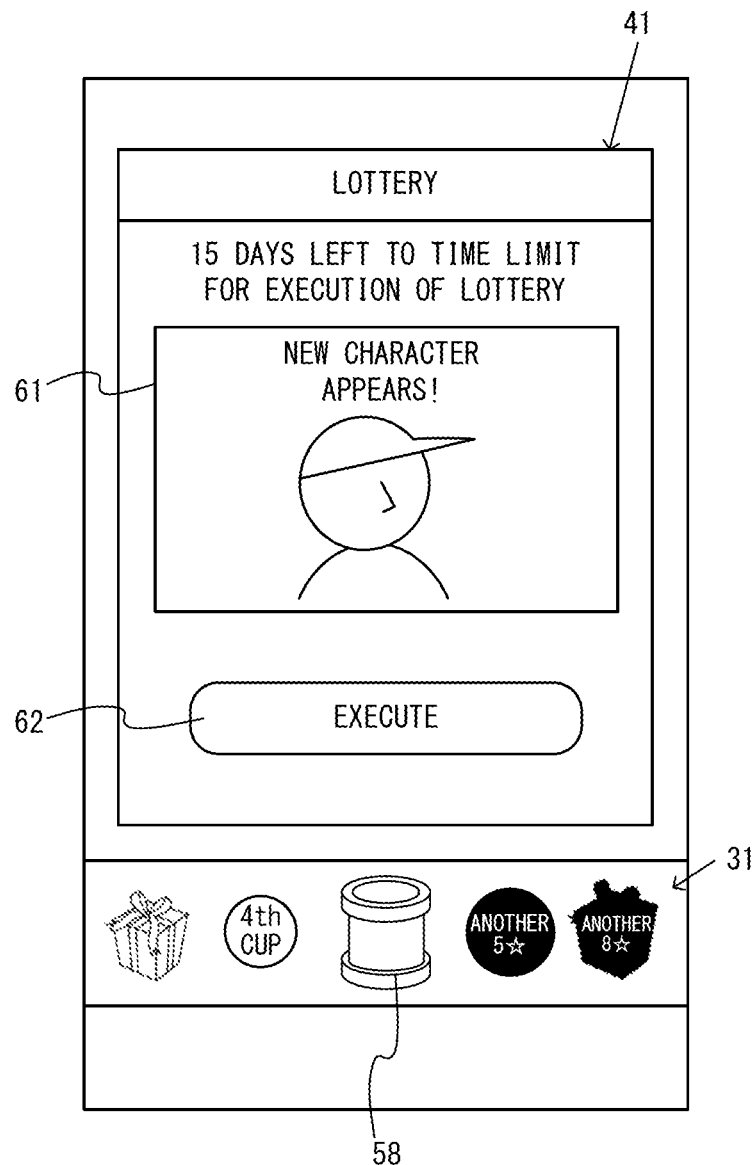
FIG. 7 shows an example of a non-limiting single mode image in which a selection icon is being selected.

FIG. 7 shows an example of a single mode image when the selection icon is being selected. In FIG. 6, the selection icon 58 representing a selection based on probability for which the release condition is not satisfied, is displayed. FIG. 7 shows an example of a single mode image displayed when the release condition for the selection represented by the selection icon 58 is satisfied as a result of acquisition of some stars by the user from the state shown in FIG. 6. In the present embodiment, when the selection is performed, representation is performed such that a character or an item jumps out from a pipe. Therefore, the selection icon is an icon representing a pipe that allows the user to image a selection.

As shown in FIG. 7, when the selection icon 58 is being selected, a selection image representing the content of a selection that the user can execute is displayed in the detail display area 41. The selection image includes an image 61 representing a game object (i.e., a character or an item) that can be acquired by the selection. The selection image includes information indicating a time limit by which the user can execute the selection (by which the user can receive the game object through the selection). In FIG. 7, this information is a message "15 days left to the time limit for execution of selection".

The selection image includes a selection button image 62 as a button image for making an instruction of a selection. That is, when an input to the selection button image 62 is performed, the information processing system selects a predetermined number of game objects (one game object in this example) by a selection, and gives the selected game object to the user. A specific method of selection is discretionary. For example, the information processing system may select, based on probability, the predetermined number of game objects from among a plurality of types of game objects that are selection candidates. In the present embodiment, the game application also has a mode (e.g., shop mode) different from the single mode and the multi-mode. The user can perform a selection for game objects in return for a predetermined item in this mode (e.g., the aforementioned jewel, or an item that the user can acquire by charging). Meanwhile, a selection to be performed by an input to the selection button image 62 (i.e., a selection that becomes executable when the release condition is satisfied) can be performed without consuming the predetermined item.

In the present embodiment, when the selection icon 58 is being selected in the single mode image, the user is allowed to perform a selection. In another embodiment, an item (e.g., a ticket) for performing a selection may be given to the user. In another embodiment, the item for performing a selection can be regarded as the gift described above.

As described above, in the single mode, the user can satisfy the release condition for an in-game element (i.e., a cup, a gift, and/or a selection) by accumulating rewards (stars) that the user can earn through the game. When the release condition is satisfied, the user can make a game of a new cup playable, acquire a gift, and perform a selection. In the single mode, the user progresses the game while increasing playable cups by accumulating stars.

In the present embodiment, the user can repeatedly play a game of a racing course that has become playable, and the number of times the user performs the game is not limited. However, in another embodiment, the information processing system may bring a racing course that has become playable into an unplayable state when some condition is satisfied for the racing course (e.g., when the game has been performed a predetermined number of times).

2-2. Multi-Mode

Next, the outline of processing in the multi-mode will be described. In the multi-mode, a racing game is performed, in which a racing car of a user races with a racing car of another user. Racing courses to be used in the multi-mode include the racing courses used in the single mode. Specifically, in the present embodiment, the racing courses included in the respective cups in the single mode are also used in the multi-mode. Thus, the user can perform the games of the racing courses in the single mode, also in the multi-mode. The racing courses used in the multi-mode may include racing courses that are not used in the single mode, and may not necessarily include all the racing courses used in the single mode.

Figure 8:
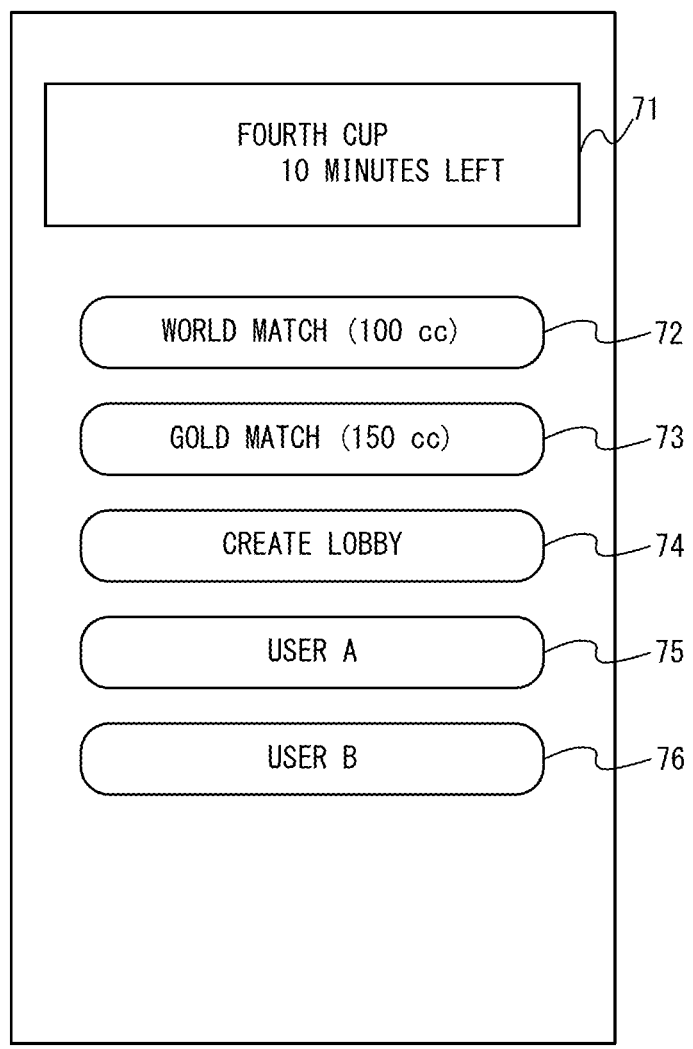
FIG. 8 shows an example of a non-limiting multi-mode image.

FIG. 8 shows an example of a multi-mode image. In the present embodiment, when the multi-mode is started in the game application, the terminal device 2 displays a multi-mode image as shown in FIG. 8 on the display section 24.

In the multi-mode, the user enters a lobby before starting a game of a racing course. In this specification, a "lobby" designates a group of users who play the game of the racing course together (a virtual space including this group is sometimes referred to as "lobby"). In the present embodiment, the user creates a lobby or enters a lobby created by another user to play a game with the other user in the lobby. Specifically, the user can enter the lobby by a method as follows.

As shown in FIG. 8, the multi-mode image includes a world match button image 72 for performing a world match, and a gold match button image 73 for performing a gold match. Each of the world match and the gold match is a multiplayer game in which the user races with an unspecified other user. The gold match is a game in which only users having the aforementioned gold pass can participate, while the world match is a game in which any user can participate regardless of possession of the gold pass. Each of the button images 72 and 73 is a button image with which the user performs an instruction to enter the lobby including the unspecified other user. That is, when an input of designating the world match button image 72 is performed by the user, the server 1 performs matching of the user of the terminal device 2 with the unspecified other user, and enters the user in the lobby including the other user (i.e., the server 1 adds the user to the group of the lobby). Meanwhile, when an input of designating the gold match button image 73 is performed by the user, the server 1 performs matching of the user of the terminal device 2 with the unspecified other user having the gold pass, and enters the user in the lobby including the other user. A specific method for matching is discretionary. In the present embodiment, a rate is set for each user, and the server 1 performs matching based on the rate.

As shown in FIG. 8, the multi-mode image includes a lobby creation button image 74 for making an instruction to create a lobby. When an input of designating the lobby creation button image 74 is performed by the user, the server 1 creates a new lobby including the user. Although details will be described later, a specific user (e.g., a user who is a friend of the user having created the lobby) is allowed to enter the lobby. When the user creates a lobby, the user can set the rule of a racing game to be performed in the created lobby. A method for setting the rule will be described later in detail.

As shown in FIG. 8, the multi-mode image includes lobby button images 75 and 76 with which the user performs an instruction to enter a lobby created by another user. In the present embodiment, when another user (referred to as "friend user") who is registered as a friend of the user of the terminal device 2 has created a lobby, a lobby button image regarding this lobby is displayed on the terminal device 2. Although FIG. 8 shows the case where two lobby button images 75 and 76 are displayed, lobby button images as many as friend users having created lobbies are displayed in the present embodiment. Therefore, when there is no friend user having created a lobby, no lobby button image is displayed on the terminal device 2. The lobby button image includes information indicating the user name (in FIG. 9, user A or user B) of the friend user having created the lobby. When an input of designating a lobby button image is performed by the user, the server 1 enters the user in a lobby corresponding to the lobby button image. In the present embodiment, the terminal device 2 displays a lobby button image for a lobby created by a friend user. However, in another embodiment, the terminal device 2 may display a lobby button image for a lobby created by another user present near the user of the terminal device 2, as well as the friend user. The position of each user can be specified based on position information detected by the terminal device of the user.

In the multi-mode, a racing game is performed by a plurality of users present in a lobby. As shown in FIG. 8, the multi-mode image includes a playable cup image 71. The playable cup image 71 represents a cup that is currently playable in the multi-mode. In the present embodiment, the information processing system selects one cup that is currently playable from among the cups in the single mode. In the present embodiment, the information processing system selects a cup, based on a real time. Specifically, the information processing system changes a cup to be selected, each time a predetermined period (e.g., 15 minutes) has elapsed. Then, a cup to be selected next is determined according to the aforementioned progression order. A method for selecting a cup is discretionary. In another embodiment, a cup may be selected by a method different from the method based on a real time. In the present embodiment, the playable cup image 71 includes information indicating a remaining time during which the current cup is playable (in FIG. 8, a message "you have 10 minutes left"). This allows the users to confirm the time period during which the current cup is playable.

As described above, in the present embodiment, the cup that is playable at the current time point is set to be common to all the users in the game application. However, in another embodiment, the information processing system may divide the users in the game application into groups, based on a certain criterion (e.g., countries, rates, etc., of the users), and may allow the respective groups to play different cups.

In the multi-mode, racing courses to be used for a game are determined from among racing courses included in the currently playable cup. In the present embodiment, when a racing game is performed in a lobby, the information processing system designates, in order, three racing courses (excluding a challenge course) included in the cup, thereby determining racing courses to be used in the game. For example, the information processing system designates the first racing course in the cup as a racing course in the first game after creation of the lobby. If the second game is performed subsequently to the first game in the lobby, the information processing system designates the second racing course in the cup. Thus, when the game is consecutively performed in the lobby, the first to third racing courses are repeatedly designated in order (the first racing course is designated subsequently to the third racing course), whereby the racing courses to be used in the game are determined. The racing course determining method is discretionary, and racing courses may be determined by a method other than the aforementioned method.

As described above, the information processing system changes the cup in the playable state, with the lapse of time, according to the aforementioned progression order. Therefore, in the present embodiment, all the cups become playable at least once during a predetermined period. In a time period during which one cup is in the playable state, three racing courses in this cup are in the playable states. Therefore, in the present embodiment, in the multi-mode, all the racing courses in the single mode become playable during the predetermined period (since the challenge course is substantially the same as the other racing courses as described above, it can be said that the challenge course also becomes playable when the other racing courses become playable). That is, in the multi-mode, the information processing system sets, for all the racing courses included in the single mode, whether or not all the racing courses are being permitted to be played by the user, so that all the racing courses become permitted to be played by the user at least once during the predetermined time period in the multi-mode. Thus, the user is given an opportunity to experience, in the multi-mode, all the racing courses in the single mode.

In the present embodiment, a cup (and racing courses included in the cup) that becomes playable in the multi-mode is determined regardless of whether or not each of the users in the lobby can play the cup in the single mode (i.e., whether or not the release condition of the cup is satisfied). That is, the information processing system designates a racing course in the multi-mode regardless of whether or not the racing course is permitted in the single mode to be played by another user who participates in the game in the multi-mode. That is, in the present embodiment, in the multi-mode, a cup and a racing course to be used for a game are determined irrespective of the progress status of each user in the single mode.

As described above, a user, who has not progressed much in a game in the single mode, is allowed to experience, in the multi-mode, a racing course that the user has never experienced before. In addition, a user, who is playing a game of a specific racing course in the single mode, is allowed to experience a variety of racing courses in the multi-mode. Thus, a racing course that a user has not experienced yet (or has not experienced much) is introduced to the user in the multi-mode, whereby the user is motivated to play the game of the racing course in the single mode. In addition, the information processing system performs matching without taking into account the progress status of the game in the single mode, and therefore can easily perform the matching process. Furthermore, in the present embodiment, inequality is less likely to occur among the users, and a game course can be fairly determined.

In the present embodiment, the information processing system changes, with the lapse of real time, a cup (specifically, a racing course included in the cup) that is permitted to be played by the user in the multi-mode. This allows the user to experience a variety of racing courses in the multi-mode during a given time.

(Giving of Reward in Multi-Mode)

In the present embodiment, when a game of a racing course has been performed in the multi-mode, a reward (i.e., a star) is given to the user according to a reward giving condition, as in the case where the game of the racing course has been performed in the single mode That is, the user can assist the game progress in the single mode by earning a star in the multi-mode, in addition to progressing the game in the single mode by earning a star (and clearing the racing course) in the single mode. Hereinafter, an example of earning stars in the two modes will be described with reference to FIG. 9 and FIG. 10.

FIG. 9 shows an example of change in a reward giving state. Hereinafter, an example in which the reward giving state is changed with respect to a fourth cup including three racing courses, i.e., a city course, a valley course, and a hills course, will be described with reference to FIG. 9.

In the state of (a) shown in FIG. 9, the respective racing courses in the fourth cup have not yet been played in both the single mode and the multi-mode (i.e., the user has not yet played the games of the racing courses). At this time, none of the stars assigned to the respective racing courses are given.

In the state of (b) shown in FIG. 9, the respective racing courses in the fourth cup have been played in the multi-mode (i.e., the user has played the games of the racing courses). In the example shown in FIG. 9, 5 stars are assigned to each course, and reward giving conditions as follows are respectively set with respect to the 5 stars.

First star: the score should be 3300 or more.
Second star: the score should be 3600 or more.
Third star: the score should be 3900 or more.
Fourth star: the score should be 4200 or more.
Fifth star: score should be 4500 or more.

In the example shown in FIG. 9, through the multi-mode game, the user has earned 4 stars by attaining a score of 4265 in the city course, has earned 3 stars by attaining a score of 4013 in the valley course, and has earned 2 stars by attaining a score of 3627 in the hills course.

In the present embodiment, the information processing system treats the stars earned in the multi-mode in the same manner as that for the stars earned in the single mode. Therefore, if the single mode is executed after a star has been earned in the multi-mode, the corresponding release condition may be newly satisfied in the single mode. At this time, an in-game element such as a cup newly becomes usable.

In the present embodiment, a calculation method for a score in each racing course is common between the single mode and the multi-mode. In addition, a reward giving condition set for each racing course is common between the single mode and the multi-mode. Therefore, even in the multi-mode, the user can obtain a star with the same condition as in the single mode. In another embodiment, the calculation method for a score in each racing course and/or the reward giving condition may differ between the single mode and the multi-mode. For example, it is conceivable that, in the multi-mode, the user is likely to attain a high score by cooperating with a friend user. At this time, in the multi-mode, a calculation method different from that in the single mode may be used such that a high score is less likely to be calculated (or an upper-limit value is given to a to-be-calculated score) in the multi-mode. Alternatively, a more strict reward giving condition may be used in the multi-mode than in the single mode.

Figure 10:
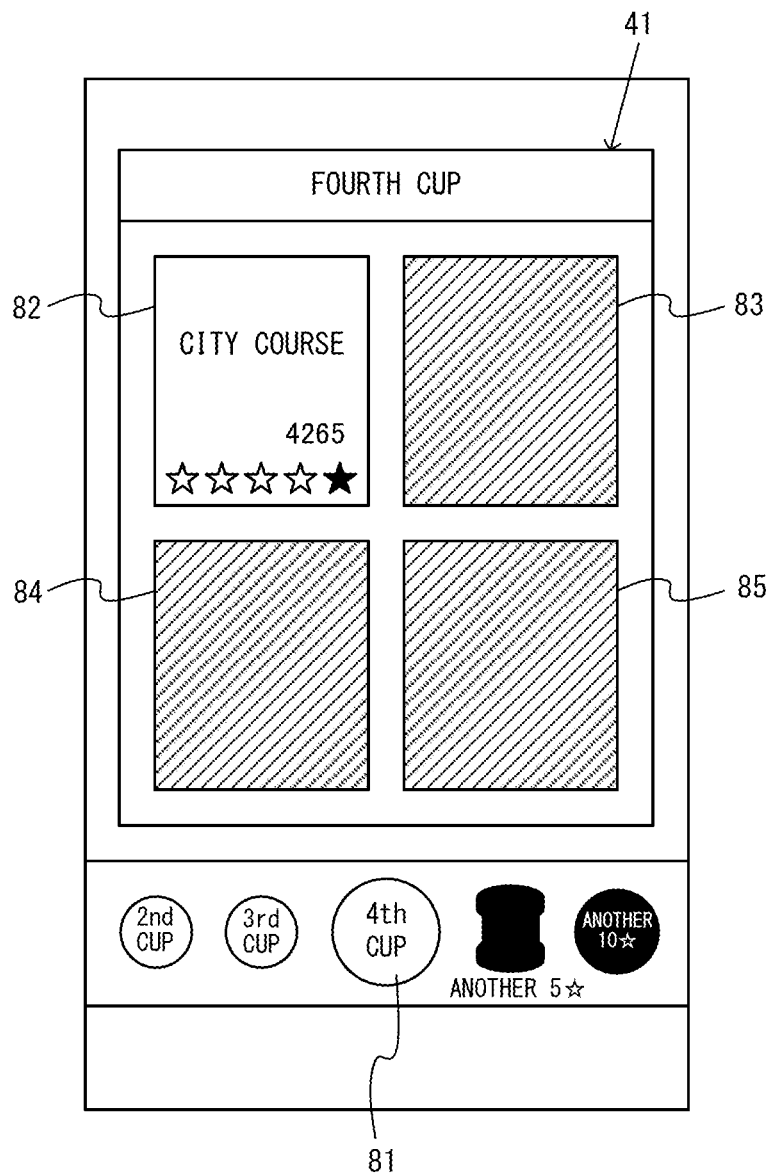
FIG. 10 shows an example of a non-limiting single mode image in which a fourth cup becomes usable by a reward earned in the multi-mode.

FIG. 10 shows an example of a single mode image in a case where the fourth cup becomes usable by a reward earned in the multi-mode. Specifically, FIG. 10 shows an example of a single mode image in a case where the fourth cup becomes usable after the user has performed the game in the fourth cup in the multi-mode and earned stars from the state where the fourth cup is not usable (e.g., the state shown in FIG. 5). In the state shown in FIG. 10, the user has already cleared the third cup.

As shown in FIG. 10, when the release condition for the fourth cup is satisfied and the fourth cup becomes usable, a cup icon 81 representing the fourth cup is displayed in a manner indicating that the fourth cup is usable. Then, a cup image regarding the fourth cup is displayed in the detail display area 41 in accordance with that the cup icon 81 representing the fourth cup is selected. At this point in time, the game of the city course as the first racing course in the fourth cup has not been performed and cleared in the single mode, the cup image is displayed such that the course image 82 representing the city course includes course name information, etc., while the other course images 83 to 85 do not include course name information, etc.

As for the course image 82 representing the city course, the game has been performed in the multi-mode while the game has not been performed in the single mode. Therefore, the result of the game in the multi-mode is reflected in the course image 82. That is, the course image 82 includes best score information indicating the score of "4265" attained through the game in the multi-mode, and acquisition state information indicating 4 stars having been earned. Thus, when a game of a certain racing course has not been performed in the single mode but has already been performed in the multi-mode, the course image (e.g., the course image 82 in FIG. 10) of this racing course includes information indicating the result of the game, and therefore is different in content from the course image (e.g., course image 44 in FIG. 4) in the case where the game has not been performed in the multi-mode.

In the present embodiment, the terminal device 2 displays, as acquisition state information included in a course image, stars earned in the single mode and stars earned in the multi-mode without distinguishing them (i.e., in the same display manner). In another embodiment, the terminal device 2 may display the stars earned in the single mode and the stars earned in the multi-mode in different display manners (e.g., in different colors).

Since the game of the city course has not yet been performed in the single mode by the user, the course image 82 does not include clear information indicating "clear" or "complete". Therefore, the course image 82 allows the user to confirm that he/she has performed the game of the city course in the multi-mode but has not yet performed (or cleared) the game of the single mode.

Referring back to FIG. 9, in the state of (c) shown in FIG. 9, the respective racing courses in the fourth cup have already been played in the single mode. In the example shown in FIG. 9, through the game in the single mode after the multi-mode, the user has satisfied the reward giving condition for the fifth star with respect to the city course (i.e., has earned a score that satisfies the reward giving condition), has satisfied the reward giving condition for the fourth star with respect to the valley course, and has satisfied the reward giving condition for the second star with respect to the hills course. At this time, the information processing system gives, to the user, a star that does not overlap with the star the user has already earned in the multi-mode. That is, since the user has already earned up to the fourth star with respect to the city course, the user is given the fifth star (i.e., one star). Since the user has already earned up to the third star with respect to the valley course, the user is given the fourth star (i.e., one star). Since the user has already earned up to the second star with respect to the hills course, the user is not given a new star. As this time, as for display of acquisition state information of the stars in the course image in the single mode image, an acquirement status indicating the total of the stars earned in the single mode and the stars earned in the multi-mode is displayed (see (c) of FIG. 9).

In FIG. 9, the case where stars are earned in the single mode after stars have been earned in the multi-mode, is described. However, the same applies to a case where stars are earned in the multi-mode after stars have been earned in the single mode. That is, in a case where, after stars have been earned in the single mode with respect to a certain racing course, the game of the racing course is executed in the multi-mode and the reward giving condition is newly satisfied, only a star corresponding to the newly satisfied reward giving condition is newly given to the user. For example, after the state of (c) shown in FIG. 9, if the user has satisfied the reward giving condition for the fifth star in the game of the valley course in the multi-mode, the user is given the fifth star because the stars up to the fourth star have already been given to the user.

As described above, in the present embodiment, synchronization is achieved between the single mode and the multi-mode with respect to the acquisition status of stars to be given to the user (in other words, stars given in the single mode and stars given in the multi-mode are summed). Then, the information processing system makes an in-game element usable according to the given stars, regardless of whether the stars are those given according to the result of the game in the single mode or those given according to the result of the game in the multi-mode. Thus, as for a racing course in which the user has attained a certain score in the multi-mode (and thereby earned a certain number of stars), the user need not attain a similar score in the single mode, whereby the user can efficiently progress the game in the single mode.

In the present embodiment, since the user can earn stars even in the multi-mode, motivation for performing a game in the multi-mode can be given to the user. In addition, in the present embodiment, for example, the user can perform a game with a strategy such that, if it is difficult to earn a star in the single mode, the user earns the star in the multi-mode with cooperation of another user. Thus, the game strategy can be enhanced.

As described above, the information processing system gives a star to the user when a reward giving condition is satisfied for the first time through the single mode and the multi-mode, and does not redundantly give a star when a reward giving condition, which has already been satisfied in either the single mode or the multi-mode, is satisfied again. That is, in the present embodiment, when a record value (i.e., the best score) is updated in the single mode or the multi-mode and the updated record value satisfies a reward giving condition, the information processing system gives a star corresponding to the reward giving condition to the user. This reduces the risk of excessive reduction in difficulty in earning a star, thereby reducing the risk of degrading the interest of the game.

As described above, in the present embodiment, when the best score has been achieved in the multi-mode with respect to a racing course that is not allowed to be played by the user in the single mode, the information processing system displays, in the single mode, an image (the course image 82 shown in FIG. 10) in which the best score is associated with the racing course, on the display section 24 of the terminal device 2. Thus, even when the best score has been updated in the multi-mode, the best score can be correctly displayed in the single mode.

In the present embodiment, when the user has performed a game of a racing course in the multi-mode, the user can earn a star but it is not determined that the racing course has been cleared in the single mode. That is, even when a racing course, which is not allowed to be played by the user in the single mode, has been played and cleared by the user in the multi-mode, the information processing system does not put the racing course in the cleared state in the single mode. Thus, the fun factor of the single mode, in which clearing a racing course allows a user to progress to the next racing course (or next cup), is prevented from being degraded by the multi-mode. Thus, the interest of the game in the single mode is prevented from being degraded by the multi-mode.

In the present embodiment, when the user has played a game of a racing course in the multi-mode and the result thereof satisfies a reward giving condition, the information processing system gives a star corresponding to the reward giving condition to the user even if the game of the racing course has not been played by the user in the single mode. Thus, the user can obtain the effect of the star (i.e., release of an in-game element) before playing the game of the racing course in the single mode, whereby efficiency of the gameplay in the single mode can be further enhanced.

In another embodiment, timing at which a star is given to the user through a game of a racing course in the multi-mode is discretionary. For example, in another embodiment, a star to be given to the user through a game of a racing course in the multi-mode may be given after the user has cleared the racing course in the single mode.

In the present embodiment, the user is allowed to earn a predetermined item (coin) during a game of a racing course. The earned coin is an item that the user can use to acquire another item (racing car, etc.). In the present embodiment, the user is allowed to earn a coin in both the single mode and the multi-mode, and the information processing system manages the coins earned in the two modes without distinguishing them. That is, the information processing system calculates, as the number of coins possessed by the user, the total number of coins earned in the two modes. Thus, the information processing system may also manage the items other than stars, commonly between the single mode and the multi-mode.

In the present embodiment, a rank is set to each user in the single mode, and the aforementioned rate is set to each user in the multi-mode. The rank indicates the level of the user in the single mode, and varies as the user plays a game in the single mode. For example, the strength of a competitor in a racing game in the single mode is determined based on the rank. The rate indicates the level of each user in the multi-mode, and varies as the user plays a game in the multi-mode. As described above, the rate is used for matching of users in the multi-mode. In the present embodiment, the information processing system manages the rank and the rate separately from each other. That is, the rank is not varied due to the game result in the multi-mode, and the rate is not varied due to the game result in the single mode. Thus, as for parameters set on each user, some parameters may be managed separately between the single mode and the multi-mode.

(Setting of Rule in Multi-Mode)

As described above, when the user creates a lobby in the multi-mode, the user can set a rule of a racing game in the lobby. Hereinafter, a process of setting a rule will be described with reference to FIG. 11.

Figure 11:
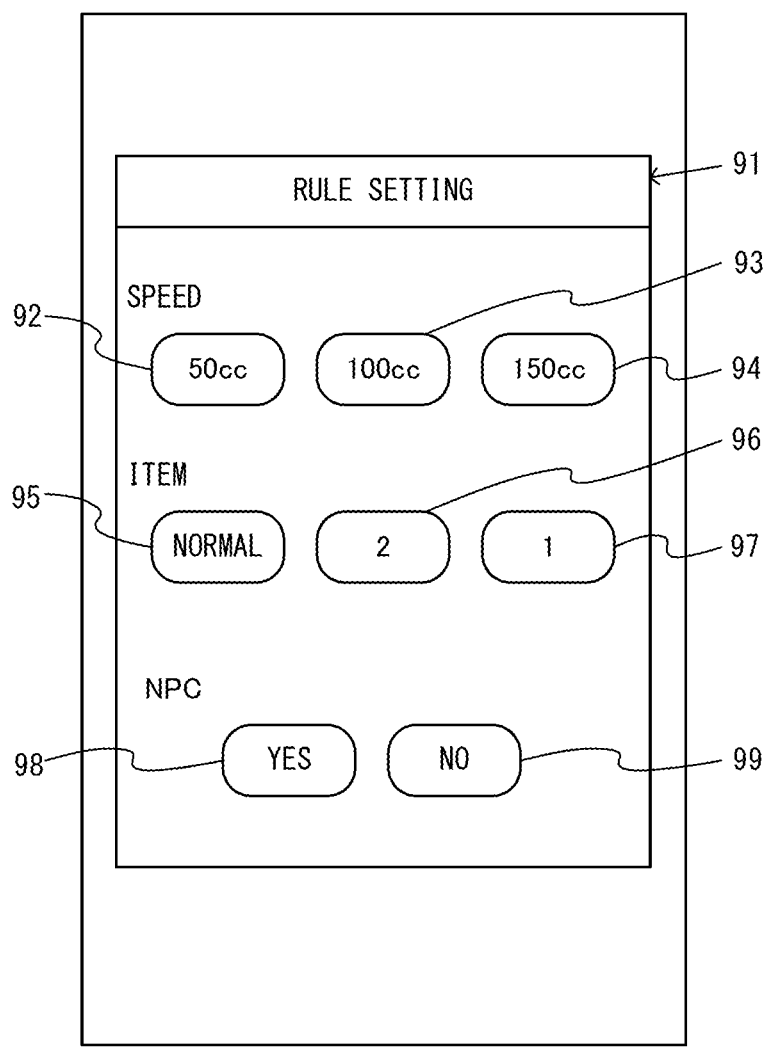
FIG. 11 shows an example of a non-limiting rule setting image.

FIG. 11 shows an example of a rule setting image. In the present embodiment, when an input of designating the lobby creation button image 74 is performed by the user while the multi-mode image is displayed on the display section 24, the terminal device 2 displays a rule setting image 91 on the display section 24 (see FIG. 11). The rule setting image 91 is a user interface image with which the user sets a rule of a racing game to be performed in the created lobby.

In the present embodiment, the rule setting image 91 includes instruction button images 92 to 94 regarding setting speeds (e.g., maximum speeds) of racing cars in the racing game to be performed in the created lobby. In FIG. 11, the instruction button image 92 indicating "50 cc" is a button image for making an instruction to set the speed of each racing car to a relatively low speed. The instruction button image 93 indicating "100 cc" is a button image for making an instruction to set the speed of each racing car to a moderate speed. The instruction button image 94 indicating "150 cc" is a button image for making an instruction to set the speed of each racing car to a relatively high speed. The information processing system sets the rule regarding the setting speed of each racing car in the racing game to be performed in the created lobby, according to a user's instruction to the instruction button images 92 to 94.

In the present embodiment, in the single mode, the user can select one of the three types of setting speeds for each game in a racing course. In the present embodiment, the higher the setting speed is, the higher the calculated score is.

The rule setting image 91 further includes instruction button images 95 to 97 regarding the number of items to be used by each of characters in the racing game to be performed in the created lobby. In FIG. 11, the instruction button image 95 indicating "normal" is a button image for making an instruction to set the number of items to be used by each character in the racing game, to the same number as in the single mode.

In the present embodiment, a character can earn an item during a racing game, and can accelerate its own racing car or impede another racing car by using the earned item. In the single mode, for each of characters that appear in the racing game, the number of items that the character possesses is set for each racing course. Specifically, for each character, any of "1", "2", and "3" is set as the number of items to be possessed, for each racing course. For example, in a racing course in which the number of items to be possessed by a certain character is set to 3, this character can possess 3 items earned during the game, and can use the 3 items. In a racing course in which the number of items to be possessed is set to be greater than 1 (e.g., 2 or 3), a character can possess and use a plurality of items, and therefore, can advantageously progress the race in the racing game as compared to a character, of which the number of items to be possessed is 1. When the instruction button image 95 is designated, setting regarding the number of items to be possessed in the single mode is used also in the racing game in the multi-mode.

Meanwhile, the instruction button image 96 indicating "2" in FIG. 11 is a button image for making an instruction to set the number of items to be used by each character in the racing game, to 2 (regardless of the setting of the number of items to be possessed in the single mode). The instruction button image 97 indicating "1" in FIG. 11 is a button image for making an instruction to set the number of items to be used by each character in the racing game, to 1 (regardless of the setting of the number of items to be possessed in the single mode). When the instruction button image 96 or 97 is designated, setting of the number of items to be possessed in the single mode is not used in the racing game in the multi-mode. That is, in the above case, the number of items to be possessed by each character when the character has earned items during the game is uniformly (i.e., nor for each character) set to the number according to the designated instruction button image 96 or 97.

As described above, in the present embodiment, when the user has created a lobby in the multi-mode, the user can set a rule that the number of items to be possessed by each character is uniformly 2 regardless of the character. When the user uses a character for which the number of items to be possessed in a racing course is set to 1, the user is likely to attain a higher rank and earn a higher score in the multi-mode than in the single mode, and therefore, it can be said that the above rule is a rule that allows a reward giving condition to be satisfied more easily. As described above, in the present embodiment, the information processing system can execute a game of a racing course in the multi-mode under a game condition (i.e., rule) that allows the reward giving condition to be satisfied more easily than a game condition used when the game of the racing course is executed in the single mode. Thus, a user who wants to earn more stars can be motivated to play the game in the multi-mode.

In the present embodiment, when the user has created a lobby in the multi-mode, the user may set a rule so that the number of items to be possessed by each character is uniformly 1 regardless of the character. In a case where the user uses a character for which the number of items to be possessed in a racing course is set to 2 or 3, the user is less likely to attain a higher rank and earn a higher score in the multi-mode than in the single mode, and therefore, it can be said that the above rule is a rule that allows a reward giving condition to be satisfied less easily. As described above, in the present embodiment, the information processing system can execute a game of a racing course in the multi-mode under a game condition (i.e., rule) that allows the reward giving condition to be satisfied less easily than a game condition used when the game of the racing course is executed in the single mode.

The rule setting image 91 further includes instruction button images 98 and 99 regarding a non-player character ("NPC" in FIG. 11) that appears in the racing game to be performed in the created lobby. In FIG. 11, the instruction button image 98 indicating "YES" is a button image for making an instruction to cause a non-player character to appear in the racing game, and the instruction button image 99 indicating "NO" is a button image for making an instruction not to cause a non-player character to appear in the racing game. The information processing system determines whether or not to cause a non-player character to appear in the racing game to be performed in the created lobby, according to a user's instruction to the instruction button image 98 or 99.

In the world match and the gold match described above, a rule of a racing game has been determined in advance, and therefore, the user cannot set a rule. For example, in the world match, the speed of each racing car is set to "100 cc". In the gold match, the speed of each racing car is set to "150 cc" or "200 cc" (e.g., whether the speed is "150 cc" or "200 cc" is determined based on the real time, and is switchable with the lapse of time). In the world match and the gold match, setting of the number of items to be possessed by each character in the single mode is adopted, and no non-player character appears.

3. Specific Example of Processing in Information Processing System

Figure 12:
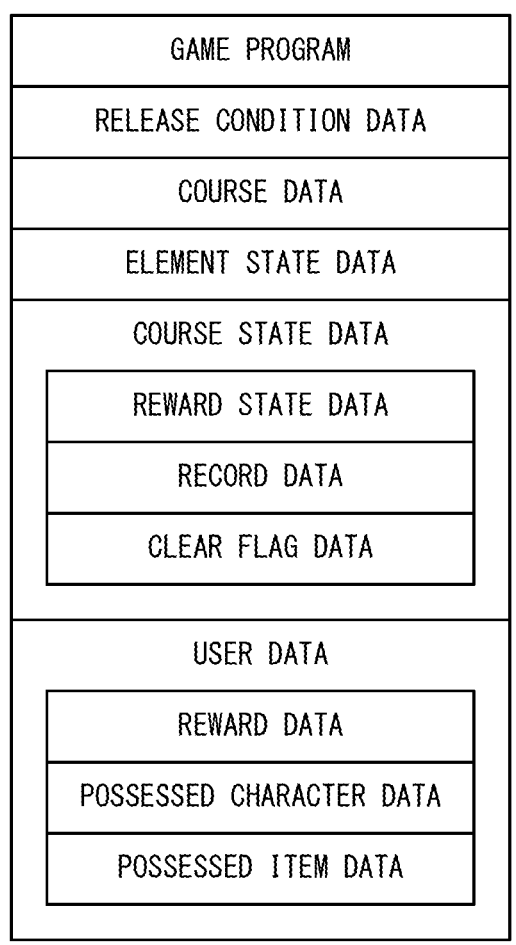
FIG. 12 shows an example of various data used for information processing in the non-limiting information processing system.

Next, a specific example of information processing in the information processing system will be described with reference to FIG. 12 to FIG. 16. FIG. 12 shows an example of various data used for information processing in the information processing system. The respective data shown in FIG. 12 are stored in the storage section 22 of the terminal device 2 (or the memory of the processing section 21), for example.

As shown in FIG. 12, the terminal device 2 stores therein a game program (in other words, an information processing program) for executing the aforementioned game application. When the processing section 21 of the terminal device 2 executes the game program, game processing (see FIG. 13 to FIG. 16) described later are executed in the terminal device 2.

As shown in FIG. 12, the terminal device 2 has release condition data stored therein. The release condition data includes data indicating a release condition regarding the aforementioned in-game elements (i.e., a cup, a gift, and a selection) usable in the single mode.

As shown in FIG. 12, the terminal device 2 has course data stored therein. The course data is data regarding each cup used in the game application and racing courses included in the cup. The course data includes, for example, data indicating racing courses included in each cup, and data indicating topography and arrangement of items in each racing course. The course data also includes data indicating a reward giving condition of each racing course.

As shown in FIG. 12, the terminal device 2 has, stored therein, element state data indicating the state regarding each in-game element. The element state data indicates, for each in-game element, whether or not a release condition has been satisfied (i.e., whether or not the in-game element is released).

As shown in FIG. 12, the terminal device 2 has, stored therein, course state data indicating the state regarding each racing course. In the present embodiment, the course state data includes, for each racing course, reward state data, record data, and clear flag data. The reward state data indicates an acquisition status of the user regarding rewards (i.e., stars) assigned to the racing course. The record data indicates the best score in the racing course. The clear flag data indicates whether or not the racing course has been cleared.

As shown in FIG. 12, the terminal device 2 has, stored therein, user data regarding the user. In the present embodiment, the user data includes reward data, possessed character data, and possessed item data. The reward data indicates the number of rewards (i.e., stars) that the user has earned. The possessed character data indicates characters that the user possesses (i.e., characters usable in a racing course). The possessed item data indicates items that the user possesses.

The entirety or a part of the data shown in FIG. 12 may be stored in the server 1 as well as in the terminal device 2. The data stored in the server 1 may not necessarily be stored in the terminal device 2. At this time, when the terminal device 2 uses the data shown in FIG. 12, the terminal device 2 may acquire the data from the server 1 at an appropriate time.

Figure 13:
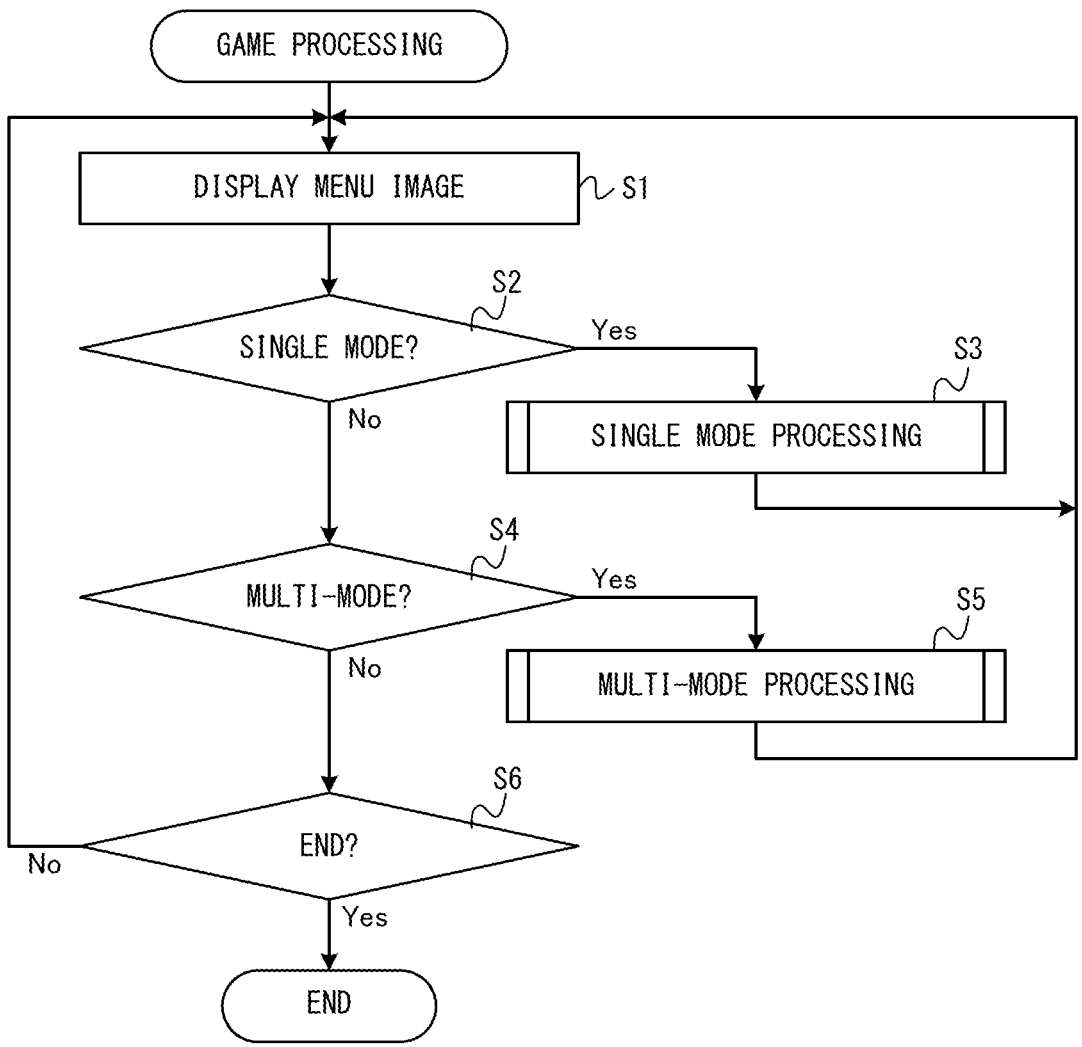
FIG. 13 is a flowchart showing an example of a flow of game processing executed by the non-limiting terminal device.

FIG. 13 is a flowchart showing an example of a flow of game processing executed by the terminal device 2. The sequential game processing shown in FIG. 13 is executed when the game program stored in the storage section 22 is started.

In the present embodiment, the CPU (in other words, a processor) of the processing section 21 of the terminal device 2 executes the game program stored in the storage section 22, thereby executing processes in steps shown in FIG. 13 to FIG. 16. However, in another embodiment, some of the processes in the steps may be executed by a processor (e.g., a dedicated circuit or the like) other than the CPU. Meanwhile, some of the processes in the steps shown in FIG. 13 to FIG. 16 may be executed in the server 1 if the terminal device 2 is communicable with the server 1. The processes in the steps shown in FIG. 13 to FIG. 16 are merely examples. The order of the processes in the steps may be changed, or other processes may be executed in addition to (or instead of) the processes in the steps so long as similar results can be obtained.

The processing section 21 of the terminal device 2 executes the processes in the steps shown in FIG. 13 to FIG. 16 by using the memory (or the storage section 22). That is, the CPU of the processing section 21 stores, in the memory, data obtained in each process step, and reads out the data from the memory when using the data in the subsequent process steps.

In a series of processes shown in FIG. 13, first, in step S1, the processor creates a menu image and displays the menu image on the display section 24. Although not shown in the drawings, the menu image includes a single mode button image indicating an instruction to start the single mode, and a multi-mode button image indicating an instruction to start the multi-mode. Therefore, in the state where the menu image is displayed, the user can cause the terminal device 2 to start the processing in the single mode or the multi-mode. Subsequent to step S1, the process in step S2 is executed.

In step S2, the processor determines whether or not an instruction to start the single mode has been performed to the menu image by the user. For example, the processor determines whether or not an input to the single mode button image has been performed by the user. In the present embodiment, when determining whether or not the input has been performed by the user, the processor acquires, from the input section 23, data indicating an operation performed to the input section 23, and determines presence/absence of the input and the content of the input, based on the acquired data. When the determination result in step S2 is positive, the process in step S3 is executed. On the other hand, when the determination result in step S2 is negative, the process in step S4 described later is executed.

In step S3, the processor executes single mode processing. The single mode processing is information processing for progressing a game in the single mode. The single mode processing will be described later in detail (see FIG. 14 and FIG. 15). After the single mode processing in step S3 has ended, the process in step S1 is executed again.

In step S4, the processor determines whether or not an instruction to start the multi-mode has been performed to the menu image by the user. For example, the processor determines whether or not an input to the multi-mode button image has been performed by the user. When the determination result in step S4 is positive, the process in step S5 is executed. On the other hand, when the determination result in step S4 is negative, the process in step S6 described later is executed.

In step S5, the processor executes the multi-mode processing. The multi-mode processing is information processing for progressing a game in the multi-mode. The multi-mode processing will be described later in detail (see FIG. 16). After the multi-mode processing in step S5 has ended, the process in step S1 is executed again.

In step S6, the processor determines whether or not to end the game application. For example, the processor determines whether or not an instruction to end the game application has been performed by the user. When the determination result in step S6 is negative, the process in step S1 is executed again. Thereafter, the series of processes in steps S1 to S6 are repeatedly executed until it is determined in step S6 to end the game application. On the other hand, when the determination result in step S6 is positive, the processor ends the game processing shown in FIG. 13.

Figure 14:
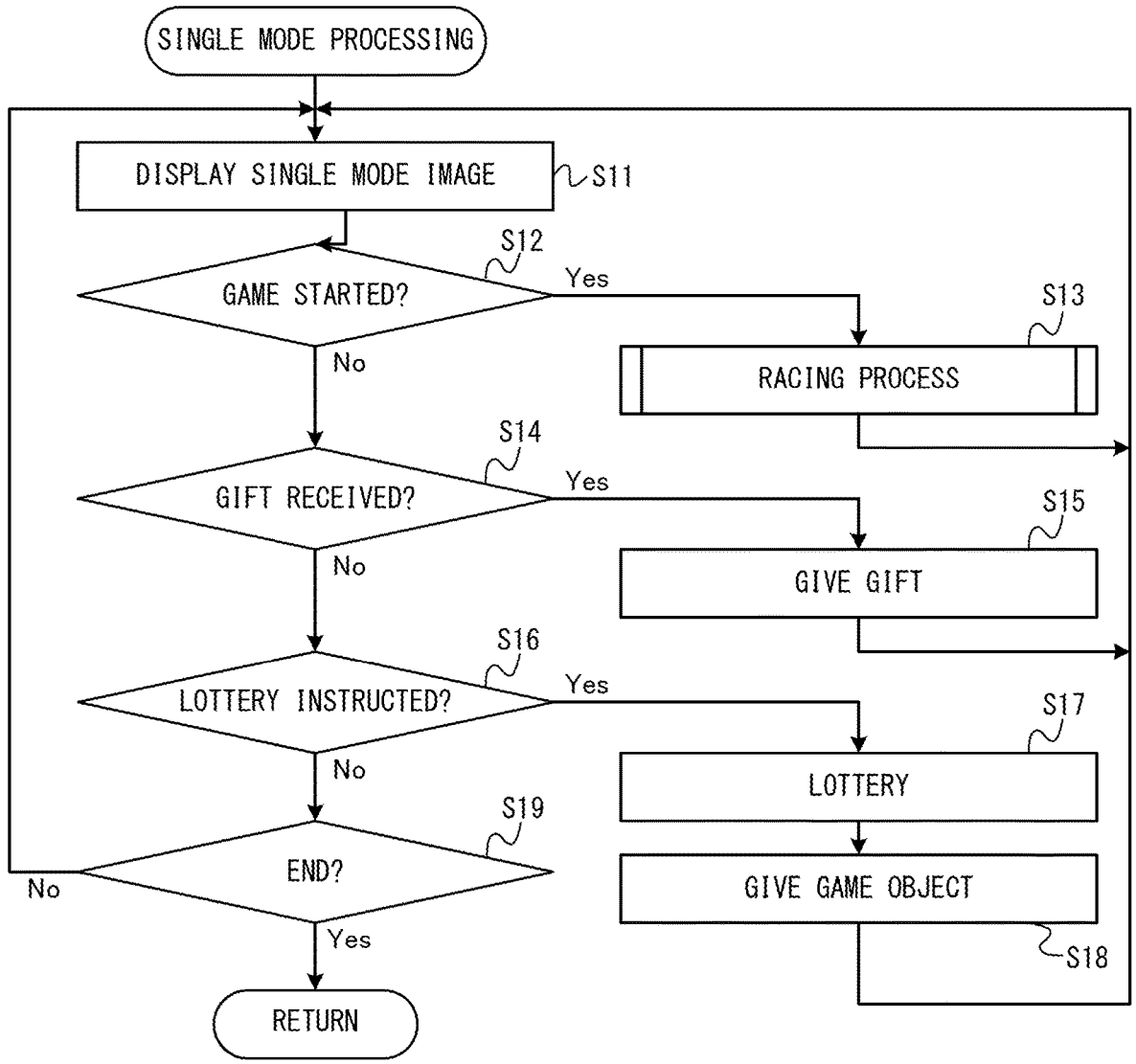
FIG. 14 is a sub-flowchart showing an example of a specific flow of non-limiting single mode processing.

FIG. 14 shows a sub-flowchart showing an example of a specific flow of the single mode processing. In the single mode processing, first, in step S11, the processor creates the aforementioned single mode image (see FIG. 4 to FIG. 7, and FIG. 10), and displays the single mode image on the display section 24. At this time, the processor determines a display manner for icons included in the single mode image (i.e., whether a display manner indicating that a release condition is satisfied or a display manner indicating that the release condition is not satisfied), based on the element state data stored in the memory. When a cup image is displayed in the detail display area 41, the processor determines a display manner for a course image (specifically, for example, whether or not to display various information such as course name information), based on the course state data stored in the memory. Subsequent to step S11, the process in step S12 is executed.

Although not shown in FIG. 14, when the single mode image is displayed, the processor scrolls the icons in the single mode image in accordance with that an input for scrolling the icons has been performed by the user, thereby changing the icon being selected, and switching the content displayed in the detail display area 41.

In step S12, the processor determines whether or not an instruction to start a racing game has been performed to the single mode image by the user. Specifically, the processor determines whether or not an input of designating a course image indicating a playable racing course has been performed by the user while the cup image is displayed in the detail display area 41 (see FIG. 4, FIG. 5, and FIG. 10). The "course image indicating a playable racing course" is a course image in which course name information is displayed. When the determination result in step S12 is positive, the process in step S13 is executed. On the other hand, when the determination result in step S12 is negative, the process in step S14 is executed.

In step S13, the processor performs a racing process for executing the racing game in the racing course. Hereinafter, the racing process will be described in detail with reference to FIG. 15.

Figure 15:
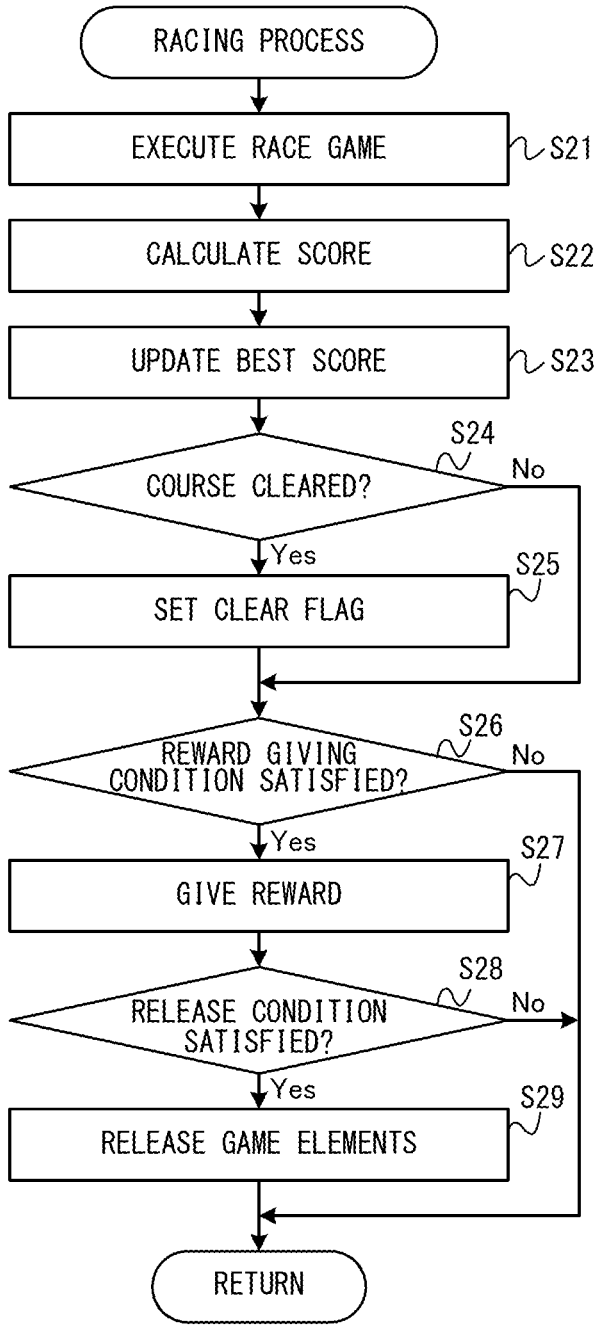
FIG. 15 is a sub-flowchart showing an example of a specific flow of a non-limiting racing process.

FIG. 15 is a sub-flowchart showing an example of a specific flow of the racing process. In the racing process, first, in step S21, the processor executes the racing game. A specific process for executing the racing game is discretionary, and may be the same as the conventional process. For example, the processor causes a racing car of a player character to move based on an operation input performed by the user, and operates a non-player character according to an algorithm defined in the game program. When the racing game has ended, the process in step S22 is executed.

In step S22, the processor calculates a score indicating the result of the racing game in step S21 played by the user. Subsequent to step S22, the process in step S23 is executed.

In step S23, the processor updates the best score according to need. That is, when the score calculated in step S22 is better in the game than the score indicated by the record data stored in the memory (i.e., when the calculated score is higher than the score indicated by the record data), the processor updates the best score. That is, the processor updates the value of the record data stored in the memory to the value of the calculated score. When the calculated score is not higher than the score indicated by the record data, the processor does not update the record data. Subsequent to step S23, the process in step S24 is executed.

In step S24, the processor determines whether or not the racing course has been cleared in the racing game executed in step S21. When the determination result in step S24 is positive, the process in step S25 is executed. On the other hand, when the determination result in step S24 is negative, the process in step S25 is skipped and the process in step S26 is executed.

In step S25, the processor sets a clear flag on the racing course in the racing game executed in step S21. Specifically, the processor updates the clear flag data stored in the memory so as to indicate that the clear flag is set on the racing course. Subsequent to step S25, the process in step S26 is executed.

In step S26, the processor determines whether or not the reward giving condition is newly satisfied. That is, the processor determines whether or not the score calculated in step S22 newly satisfies the reward giving condition in the racing course. The processor can determine whether or not the reward giving condition has already been satisfied by referring to the reward state data stored in the memory. When the determination result in step S26 is positive, the process in step S27 is executed. On the other hand, when the determination result in step S26 is negative, the processor ends the racing process.

In step S27, the processor gives, to the user, a reward (i.e., a star) corresponding to the reward giving condition that has been newly determined in step S26 to be satisfied. At this time, the processor updates the reward state data and the reward data respectively included in the course state data and the user data stored in the memory. Subsequent to step S27, the process in step S28 is executed.

In step S28, the processor determines whether or not the release condition is newly satisfied due to the reward given to the user in step S27. That is, the processor determines whether or not the release condition is newly satisfied, based on the release condition data stored in the memory and the reward data updated in the step S27. When the determination result in step S28 is positive, the process in step S29 is executed. On the other hand, when the determination result in step S28 is negative, the processor ends the racing process.

In step S29, the processor releases an in-game element for which the release condition has been determined to be satisfied in step S28. That is, the processor updates the element state data stored in the memory so as to indicate that the release condition for the in-game element has been satisfied. This means that the in-game element is changed from the state where use of the in-game element by the user is not permitted to the state where use of the in-game element by the user is permitted. However, when the in-game element is a cup, the in-game element is updated to the state permitted to be used by the user, on condition that the release condition is satisfied and that a cup previous to this cup has been cleared by the user. After the process in step S29, the processor ends the racing process.

Referring back to FIG. 14, after the racing process in step S13 has ended, the process in step S11 is executed again.

Meanwhile, in step S14, the processor determines whether or not an instruction to receive a gift has been performed to the single mode image by the user. Specifically, the processor determines whether or not an input of designating the reception button image has been performed by the user while the gift image is displayed in the detail display area 41 (see FIG. 6). When the determination result in step S14 is positive, the process in step S15 is executed. On the other hand, when the determination result in step S15 is negative, the process in step S16 is executed.

In step S15, the processor gives the gift, the reception of which has been instructed in step S14, to the user. At this time, the processor updates the possessed item data included in the user data stored in the memory so as to include the given gift. After the process in step S15 has ended, the process in step S11 is executed again.

In step S16, the processor determines whether or not an instruction to execute a selection based on probability has been performed to the single mode image by the user. Specifically, the processor determines whether or not an input of designating the selection button image has been performed by the user while the selection image is displayed in the detail display area 41 (see FIG. 7). When the determination result in step S16 is positive, the process in step S17 is executed. On the other hand, when the determination result in step S16 is negative, the process in step S19 is executed.

In step S17, the processor performs a selection for selecting a game object to be given to the user. For example, the processor transmits a selection request to the server 1 via the communication section 25. In response to this request, the server 1 selects a game object through a selection from among a plurality of kinds of game objects that are selection candidates, and transmits information indicating the selected game object to the terminal device 2. The processor specifies the game object as the selection result (i.e., the game object selected by the selection) based on the information transmitted from the server 1. Subsequent to step S17, the process in step S18 is executed.

In step S18, the processor gives the game object selected by the selection in step S17 to the user. At this time, the processor updates the possessed character data and/or the possessed item data included in the user data stored in the memory so as to include the game object. Subsequent to step S18, the process in step S11 is executed again.

In step S19, the processor determines whether or not to end the single mode processing. For example, the processor determines whether or not an instruction to end the single mode has been performed by the user. This instruction is performed by an input to a button image (not shown) indicating an instruction to return to the menu image, in the single mode image. When the determination result in step S19 is negative, the process in step S11 is executed again. Thereafter, the series of processes in steps S11 to S19 are repeatedly executed until it is determined in step S19 to end the single mode. On the other hand, when the determination result in step S19 is positive, the processor ends the single mode processing shown in FIG. 14.

Figure 16:
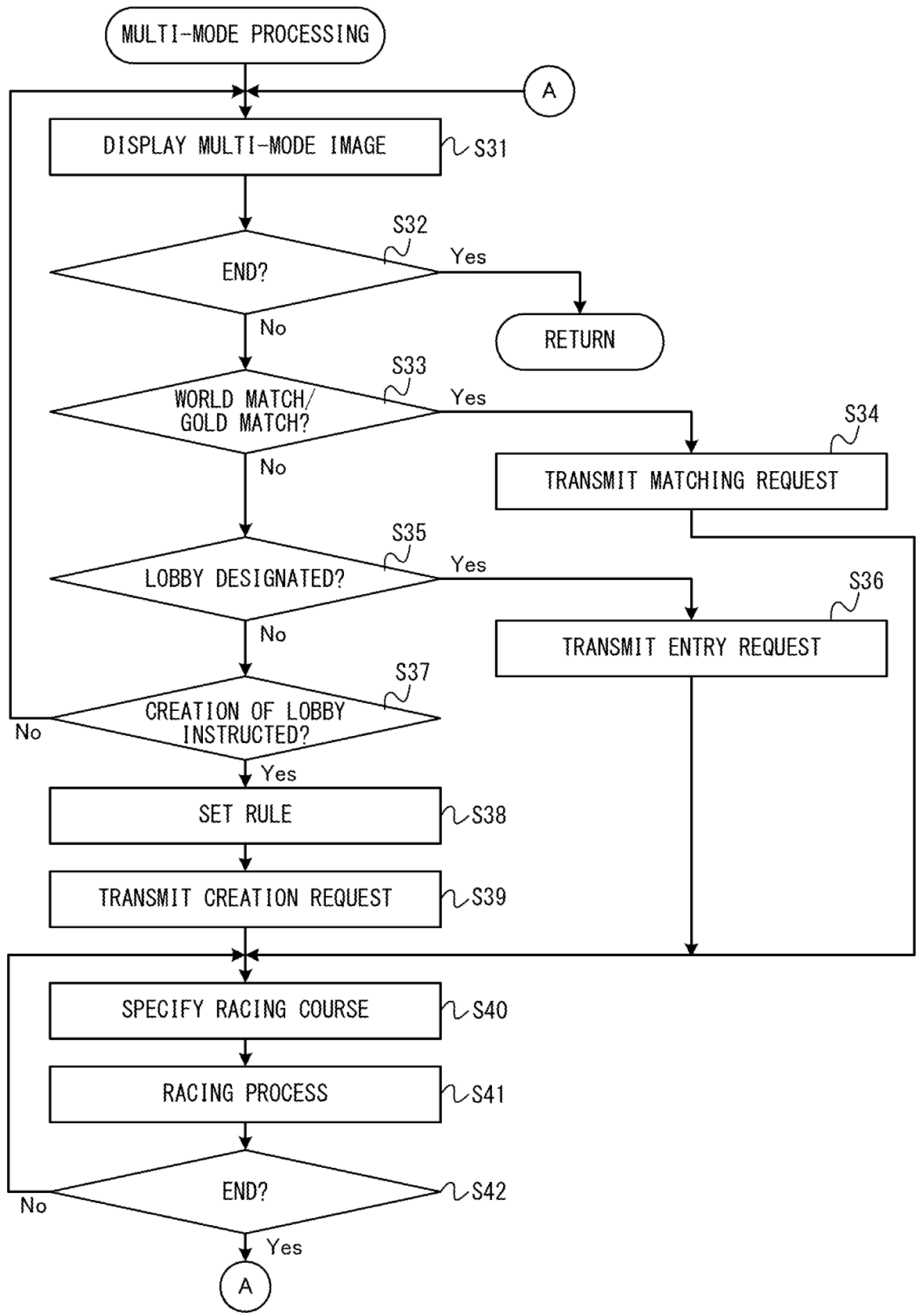
FIG. 16 is a sub-flowchart showing an example of a specific flow of non-limiting multi-mode processing.

FIG. 16 is a sub-flowchart showing an example of a specific flow of the multi-mode processing. In the multi-mode processing, first, in step S31, the processor creates the aforementioned multi-mode image (see FIG. 8), and displays the multi-mode image on the display section 24. At this time, the processor specifies a currently playable cup based on the current time, and displays a playable cup image. In addition, the processor accesses the server 1 via the communication section 25, acquires, from the server 1, information indicating a friend user who has created a lobby, and displays a lobby button image based on the acquired information. Subsequent to step S31, the process in step S32 is executed.

In step S32, the processor determines whether or not to end the multi-mode processing. For example, the processor determines whether or not an instruction to end the multi-mode has been performed by the user. This instruction is performed by an input to a button image (not shown) indicating an instruction to return to the menu image, in the multi-mode image. When the determination result in step S32 is negative, the process in step S33 is executed. Thereafter, the series of processes in steps S31 to S42 are repeatedly executed until it is determined in step S32 to end the multi-mode. On the other hand, when the determination result in step S32 is positive, the processor ends the multi-mode processing shown in FIG. 16.

In step S33, the processor determines whether or not an instruction to perform a world match or an instruction to perform a gold match has been performed to the multi-mode image by the user. Specifically, the processor determines whether or not an input of designating the world match button image 72 or the gold match button image 73 has been performed by the user. When the determination result in step S33 is positive, the process in step S34 is executed. On the other hand, when the determination result in step S33 is negative, the process in step S35 is executed.

In step S34, the processor transmits a matching request that requests the server 1 to perform matching with a competitor, to the server 1 via the communication section 25. The matching request includes information indicating the world match or the gold match, and identification information of the user of the terminal device 2. The server 1 performs matching of uses according to the matching request from the terminal device 2, and enters the user in a lobby (either an already created lobby or a newly created lobby) of the world match or the gold match. The server 1 transmits, to the terminal device 2, information related to the lobby in which the user is entered (e.g., information indicating another user in the lobby). Furthermore, in accordance with that a start condition for starting the game in the multi-mode is satisfied, the server 1 transmits a start notification to the terminal devices of the users in the lobby. The specific content of the start condition is discretionary, and may be, for example, a predetermined number of users having entered the lobby, or a predetermined time period having passed from when the lobby was created. When the start notification has been received by the terminal device 2, the processor executes the process in step S40 described later.

In step S35, the processor determines whether or not an instruction to enter the lobby has been performed to the multi-mode image by the user. Specifically, the processor determines whether or not an input of designating the lobby button image has been performed by the user. When the determination result in step S35 is positive, the process in step S36 is executed. On the other hand, when the determination result in step S35 is negative, the process in step S37 is executed.

In step S36, the processor transmits an entry request that requests the server 1 to admit entry to the lobby, to the server 1 via the communication section 25. The entry request includes identification information of the lobby and identification information of the user of the terminal device 2. In response to the entry request from the terminal device 2, the server 1 enters the user in the lobby regarding the entry request. As in the case of the matching request, the server 1 transmits, to the terminal device 2, information regarding the lobby in which the user is entered, and furthermore, transmits a start notification to the terminal devices of the users in the lobby, in accordance with that a start condition is satisfied. When the start notification has been received by the terminal device 2, the processor executes the process in step S40 described later.

In step S37, the processor determines whether or not an instruction to create a lobby has been performed to the multi-mode image by the user. Specifically, the processor determines whether or not an input of designating the lobby creation button image 74 has been performed by the user. When the determination result in step S37 is positive, the process in step S38 is executed. On the other hand, when the determination result in step S37 is negative, the process in step S31 is executed again.

In step S38, the processor sets a rule of a racing game in the lobby, the creation of which has been instructed in step S37. Specifically, the processor creates the aforementioned rule setting image (see FIG. 11), displays the rule setting image on the display section 24, and receives, from the user, an instruction indicating the content of the rule to be set. As described in the above "(Setting of rule in multi-mode)", the user designates the rule by performing an input to the rule setting image. Thus, the rule in the lobby to be created is set. Subsequent to step S38, the process in step S39 is executed.

In step S39, the processor transmits a creation request that requests creation of a lobby, to the server 1 via the communication section 25. The creation request includes information indicating the rule in the lobby and identification information of the user of the terminal device 2. The server 1 creates the lobby in response to the creation request from the terminal device 2. In addition, the server 1 accepts an entry request to the created lobby from another terminal device. Upon receiving an entry request from another terminal device, the server 1 enters the user of the other terminal device in the lobby, as in the case of the process in step S36. Furthermore, as in the case of the matching request, the server 1 transmits, to the terminal device 2, information related to the lobby in which the user is entered, and transmits a start notification to the terminal devices of the users in the lobby, in accordance with that the start condition is satisfied. When the start notification is received by the terminal device 2, the processor executes the process in step S40 described later.

In step S40, the processor specifies a racing course in which a game will be played. In the present embodiment, the racing course is specified by the method described in the above "[2-2. Multi-mode]". Subsequent to step S40, the process in step S41 is executed.

In step S41, the processor executes a racing process. The racing process in the multi-mode is performed by executing the processes in steps S21 to S23 and steps S26 to S29 of the racing process in the single mode (see FIG. 15). Therefore, also in the multi-mode, stars are given to the user based on the result of the racing game, and in-game elements are released according to the given stars, as in the single mode. Even when a racing course has been cleared in the multi-mode, this racing course is not cleared in the single mode. Therefore, the processes in step S24 and S25 are not executed in the multi-mode. As for the process of executing the racing in the multi-mode (step S21), the processor receives information regarding a racing car operated by a user of another terminal device, from the server 1 (or from the other terminal device), and controls the action of the racing car. Subsequent to step S41, the process in step S42 is executed.

In step S42, the processor determines whether or not to end the racing game in the lobby. For example, the processor determines whether or not an instruction to end the racing game has been performed by the user. When the determination result in step S42 is negative, the process in step S40 is executed again. Thereafter, the series of processes in steps S40 to S42 are repeatedly executed until it is determined in step S42 to end the game in the lobby. On the other hand, when the determination result in step S42 is positive, the process in step S31 is executed again.

4. Function and Effect of the Present Embodiment, and Modifications

In the above-described embodiment, the information processing system includes the following means:

a first designation means (step S12) for designating one game stage from among game stages (e.g., racing courses)

being permitted to be played by a user, as a first designated game stage to be played by the user, in a first game mode (e.g., a single mode);

a first game execution means (step S21) for executing a first game in the first designated game stage in the first game mode;

a first reward giving means (step S27) for giving an in-game virtual reward (e.g., a star) associated with the first designated game stage, to the user, in accordance with that a result (e.g., a score) of the first game played by the user satisfies a reward giving condition;

a second designation means (step S40) for designating one game stage as a second designated game stage to be played by the user, in a second game mode (e.g., a multi-mode) in which at least one game stage is being permitted to be played by the user regardless of whether or not the at least one game stage is being permitted to be played by the user in the first game mode;

a second game execution means (step S41) for executing a second game in the second designated game stage in the second game mode;

a second reward giving means (step S41) for giving an in-game virtual reward associated with the second designated game stage, to the user, in accordance with that a result of the second game played by the user satisfies the reward giving condition; and a state change means (steps S29, S41) for changing, based on the in-game virtual reward, an in-game element in the first game mode from a state where use of the in-game element by the user is not permitted to a state where use of the in-game element by the user is permitted, regardless of whether the in-game virtual reward is one given according to the result of the first game or one given according to the result of the second game.

According to the above configuration, regardless of that the user has played the game in the game stage in either of the two game modes, the user can put the in-game element in the state where use thereof is permitted, by using the in-game virtual reward given to the user according to the result of the game. In this case, the user, after having played the game of the game stage in one game mode, need not play the game again in the other game mode for the purpose of putting the in-game element in the state where use thereof is permitted. Therefore, efficiency of gameplay can be enhanced.

Note that "changing, based on the in-game virtual reward, an in-game element from a state where use of the in-game element by the user is not permitted to a state where use of the in-game element by the user is permitted" includes "changing the state of the in-game element on condition, at least, that the in-game virtual reward satisfies a condition (e.g., the release condition)". Therefore, the information processing system may change the state of the in-game element in accordance with that the in-game element has satisfied the condition. Alternatively, the information processing system may change the state of the in-game element when another condition (a previous cup having been cleared, as described in the above embodiment) in addition to that the in-game element has satisfied the condition.

(Modification Regarding in-Game Element)

In the above embodiment, three in-game elements, i.e., "cup (or game stage)", "gift", and "virtual based on probability (of a game object)", are adopted as in-game elements, the use permission states of which are changed based on an in-game virtual reward. In another embodiment, the in-game elements are not limited to the three elements, and any in-game elements may be adopted. For example, in another example, the information processing system may change the use permission states of one or two in-game elements out of the above three elements, based on the in-game virtual reward. Specifically, in another embodiment, the use permission state of "cup" may not necessarily be changed based on the in-game virtual reward (at this time, the use permission state may be changed on condition that a previous cup has been cleared).

(Modification Regarding Game Mode)

In the above embodiment, the two game modes are a single mode (i.e., a game mode in which a game object operated by a user during a game competes with a game object whose motion is controlled by the information processing system during the game) and a multi-mode (i.e., a game mode in which a game object operated by a user during a game competes with a game object operated by another user during the game). The two game modes may have any contents, and are not limited to the single mode and the multi-mode (which can be regarded as two game modes having different numbers of users participating the game). For example, the two game modes may be game modes having different game rules. Specifically, a game in which users compete with each other may be performed in one of the two game modes, while a game in which users cooperate with each other may be performed in the other game mode.

(Modification Regarding Reward Giving Condition)

In the above embodiment, a racing course is provided with at least one reward giving condition which is a condition for giving an in-game virtual reward associated with the racing course, and the reward giving condition is a condition related to a parameter (e.g., a score) indicating the result of a game in the racing course played by the user. That is, the information processing system calculates a parameter indicating the result of the game in the racing course played by the user, and when the parameter satisfies the reward giving condition, gives an in-game virtual reward corresponding to the reward giving condition to the user. In another embodiment, the reward giving condition need not be a condition related to the parameter. For example, the reward giving condition may be that a specific condition is accomplished in the game in the racing course (e.g., that a player character has earned a specific item or has performed a specific action).

In another embodiment, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

As described above, the above embodiment can be applied to, for example, a game system and a game program in order to, for example, enhance efficiency of gameplay.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
a processor and a memory coupled thereto, the processor being configured to control the information processing system to at least:

designate, among a plurality of virtual game stages that a user is permitted to play in a first game mode, a first designated virtual game stage to be played by the user;
execute a first game in the first designated virtual game stage in the first game mode;
give an in-game virtual reward associated with the first designated virtual game stage, to the user, provided that a result of the first game played by the user satisfies a reward giving condition;
designate a second designated virtual game stage to be played by the user in a second game mode, the user being permitted to play the second designated virtual game stage in the second game mode regardless of whether the user is permitted to play the second designated virtual game stage in the first game mode;
execute a second game in the second designated virtual game stage in the second game mode;
give the in-game virtual reward associated with the second designated virtual game stage, to the user, provided that a result of the second game played by the user satisfies the reward giving condition; and
change, based on the in-game virtual reward, an in-game element in the first game mode from a state where use of the in-game element by the user is not permitted to a state where use of the in-game element by the user is permitted, regardless of whether the in-game virtual reward is given according to the result of the first game or given according to the result of the second game.

2. The information processing system according to claim 1, wherein:
the in-game element is a selection based on probability for giving a game object to the user, and
the processor is further configured to control the information processing system, based on the in-game virtual reward, to change at least one lottery from a state where execution of the selection based on probability by the user is not permitted to a state where execution of the selection by the user is permitted.

3. The information processing system according to claim 1, wherein the in-game element is a game item.

4. The information processing system according to claim 1, wherein:
the in-game element is a new virtual game stage that the user at least initially is not permitted to play, and
the new virtual game stage is made playable based on the in-game virtual reward being given.

5. The information processing system according to claim 4, wherein:
at least some of the plurality of virtual game stages that the user is permitted to play in the first game mode are playable in an order,
clear flags are set for the virtual game stages that have been played and cleared by the user in the first game mode,
in response to a clear flag being set for a given virtual game stage in the first game mode, or in response to the in-game virtual reward being given, the user is permitted to play a subsequent virtual game stage that follows the given virtual game stage according to the order, and
virtual game stages do not become playable by the user in the first game mode after having been played and cleared by the user in the second game mode.

6. The information processing system according to claim 1, wherein:
different reward giving conditions and in-game virtual rewards are set for different virtual game stages,
the processor is configured to further control the information processing system to:
calculate a first parameter indicating the result of the first game, in the first designated virtual game stage, played by the user;
calculate a second parameter indicating the result of the second game, in the second designated virtual game stage, played by the user;
give, to the user, the in-game virtual reward corresponding to the reward giving condition that the first parameter satisfies; and
give, to the user, the in-game virtual reward corresponding to the reward giving condition that the second parameter satisfies.

7. The information processing system according to claim 6, wherein:
the processor is configured to further control the information processing system to:
calculate the first parameter each time the user plays the first designated virtual game stage;
calculate the second parameter each time the user plays the second designated virtual game stage; and
give the in-game virtual reward corresponding to the reward giving condition that is satisfied for the first time in either the first game mode or the second game mode, and
in-game virtual rewards are not redundantly given when the corresponding reward giving conditions have are already been satisfied in either the first game mode or the second game mode, and are satisfied again.

8. The information processing system according to claim 6, wherein the processor is configured to further control the information processing system to:
when the first parameter or the second parameter is calculated for the first time for each virtual game stage, store the first parameter or the second parameter as a record value for the respective virtual game stage, and
when the first parameter or the second parameter calculated in a given virtual game stage indicates a better score compared to the record value regarding the given virtual game stage, update the record value to a new record value that is the first parameter or the second parameter;
when the record value satisfies the reward giving condition in the first game mode, give the in-game virtual reward corresponding to the reward giving condition to the user; and
when the record value satisfies the reward giving condition in the second game mode, give the in-game virtual reward corresponding to the reward giving condition to the user.

9. The information processing system according to claim 8, wherein the processor is configured to further control the information processing system to, when the record value, regarding a certain virtual game stage which is not permitted to be played by the user in the first game mode, has been stored or updated in the second game mode, generate an image in which the record value is associated with the certain virtual game stage and display the image on a display in the first game mode.

10. The information processing system according to claim 6, wherein:
the reward giving conditions are the same for each of the virtual game stages, regardless of whether the virtual game stages are played in the first game mode or the second game mode, and the processor is configured to control the information processing system to execute the second game under a game condition that allows the reward giving condition to be satisfied more easily than a game condition used when the first game is executed.

11. The information processing system according to claim 6, wherein:
the reward giving conditions are the same for each of the virtual game stages, regardless of whether the virtual game stages are played in the first game mode or the second game mode, and
the processor is further configured to control the information processing system to execute the second game under a game condition that allows the reward giving condition to be satisfied less easily than a game condition used when the first game is executed.

12. The information processing system according to claim 1, wherein the processor is further configured to control the information processing system to, when a result of the second game satisfies the reward giving condition, give to the user the in-game virtual reward corresponding to the reward giving condition even when the second designated virtual game stage has not been played by the user in the first game mode.

13. The information processing system according to claim 1, wherein:
the first game mode is a game mode in which a game object operated by the user during the first game competes with a game object controlled by the information processing system during the first game, and
the second game mode is a game mode in which a game object operated by the user during the second game competes with a game object operated by another user during the second game.

14. The information processing system according to claim 13, wherein the processor is further configured to control the information processing system to designate the second designated virtual game stage regardless of whether or not the second designated virtual game stage is playable in the first game mode by the other user.

15. The information processing system according to claim 1, wherein the processor is further configured to control the information processing system to change, with a lapse of real time, which of the virtual game stages are playable by the user in the second game mode.

16. The information processing system according to claim 15, wherein in the second game mode, the processor is further configured to control the information processing system to set, for all of the virtual game stages included in the first game mode, whether or not all the virtual game stages are being permitted to be played by the user, so that all the virtual stages become permitted to be played by the user at least once during a predetermined time period in the second game mode.

17. The information processing system according to claim 1, wherein the virtual game stages are courses in a racing game.

18. An information processing apparatus, comprising:
a processor and a memory coupled thereto, the processor being configured to control the information processing apparatus to at least:
designate, from among a plurality of virtual game stages that a user is permitted to be play in a first game mode, a first designated virtual game stage to be played by the user;
execute a first game in the first designated virtual game stage in the first game mode;
give an in-game virtual reward associated with the first designated virtual game stage, to the user, provided that a result of the first game played by the user satisfies a reward giving condition;
designate a second designated virtual game stage to be played by the user in a second game mode, the user being permitted to play the second designated virtual game stage in the second game mode regardless of whether the user is permitted to play the second designated virtual game stage in the first game mode;
execute a second game in the second designated virtual game stage in the second game mode;
give the in-game virtual reward associated with the second designated virtual game stage, to the user, provided that a result of the second game played by the user satisfies the reward giving condition; and
change, based on the in-game virtual reward, an in-game element in the first game mode from a state where use of the in-game element by the user is not permitted to a state where use of the in-game element by the user is permitted, regardless of whether the in-game virtual reward is given according to the result of the first game or given according to the result of the second game.

19. A non-transitory computer-readable storage medium having stored therein instructions that, when executed by a processor of an information processing apparatus, cause the information processing apparatus to perform operations comprising:
Designating, from among a plurality of virtual game stages that a user is permitted to play in a first game mode, a first designated virtual game stage to be played by the user;
executing a first game in the first designated virtual game stage in the first game mode;
giving an in-game virtual reward associated with the first designated virtual game stage, to the user, provided that a result of the first game played by the user satisfies a reward giving condition;
designating a second designated virtual game stage to be played by the user in a second game mode, the user being permitted to play the second designated virtual game stage in the second game mode regardless of whether the user is permitted to play the second designated virtual game stage in the first game mode;
executing a second game in the second designated virtual game stage in the second game mode;
giving the in-game virtual reward associated with the second designated virtual game stage, to the user, provided that a result of the second game played by the user satisfies the reward giving condition; and
changing, based on the in-game virtual reward, an in-game element in the first game mode from a state where use of the in-game element by the user is not permitted to a state where use of the in-game element by the user is permitted, regardless of whether the in-game virtual reward is given according to the result of the first game or given according to the result of the second game.

20. An information processing method executed by an information processing system, the method comprising:
designating, from among a plurality of virtual game stages that a user is permitted to play in a first game mode, a first designated virtual game stage to be played by the user;
executing a first game in the first designated virtual game stage in the first game mode;

giving an in-game virtual reward associated with the first designated virtual game stage, to the user, provided that a result of the first game played by the user satisfies a reward giving condition;

designating a second designated virtual game stage to be played by the user in a second game mode, the user being permitted to play the second designated virtual game stage in the second game mode regardless of whether the user is permitted to play the second designated virtual game stage in the first game mode;

executing a second game in the second designated virtual game stage in the second game mode;

giving the in-game virtual reward associated with the second designated virtual game stage, to the user, provided that a result of the second game played by the user satisfies the reward giving condition; and changing, based on the in-game virtual reward, an in-game element in the first game mode from a state where use of the in-game element by the user is not permitted to a state where use of the in-game element by the user is permitted, regardless of whether the in-game virtual reward is given according to the result of the first game or given according to the result of the second game.

* * * * *